US011751069B2

(12) United States Patent
Yeddala et al.

(10) Patent No.: US 11,751,069 B2
(45) Date of Patent: Sep. 5, 2023

(54) SYSTEM AND METHOD FOR IDENTIFICATION, SELECTION AND VALIDATION OF BEST NETWORK ACCESS FOR IOT DEVICES

(71) Applicant: NIVID TECHNOLOGIES, Sterling, VA (US)

(72) Inventors: Kiran Yeddala, Ashburn, VA (US); Harsh Kapil, Sterling, VA (US)

(73) Assignee: NIVID TECHNOLOGIES, Sterling, VA (US)

(*) Notice: Subject to any disclaimer, the term of this patent is extended or adjusted under 35 U.S.C. 154(b) by 0 days.

(21) Appl. No.: 17/313,302

(22) Filed: May 6, 2021

(65) Prior Publication Data

US 2022/0377567 A1 Nov. 24, 2022

(51) Int. Cl.

| | |
|---|---|
| ***H04W 16/18*** | (2009.01) |
| ***H04W 48/16*** | (2009.01) |
| ***G16Y 20/10*** | (2020.01) |
| ***G16Y 40/10*** | (2020.01) |
| ***G06F 9/54*** | (2006.01) |
| *G06F 3/0482* | (2013.01) |
| *G06F 3/04847* | (2022.01) |
| *G06F 3/14* | (2006.01) |

(52) U.S. Cl.

CPC ............ *H04W 16/18* (2013.01); *G06F 9/543* (2013.01); *G06F 9/547* (2013.01); *H04W 48/16* (2013.01); *G06F 3/0482* (2013.01); *G06F 3/04847* (2013.01); *G06F 3/14* (2013.01); *G16Y 20/10* (2020.01); *G16Y 40/10* (2020.01)

(58) Field of Classification Search

CPC ...... H04W 16/18; H04W 48/16; G16Y 20/10; G16Y 40/10

See application file for complete search history.

(56) References Cited

U.S. PATENT DOCUMENTS

2019/0150074 A1* 5/2019 Narayanan ........ H04W 72/1215 455/434

2019/0319868 A1 10/2019 Svennebring et al.

OTHER PUBLICATIONS

Abboud Khadige et al: "eSNAP: Enabling Sensor Network Automatic Positioning in IoT Lighting Systems", IEEE Internet of Things Journal, IEEE, USA, vol. 7, No. 10, May 5, 2020 (May 5, 2020), pp. 10427-10436, XP011813882, DOI: 10.1109/JIOT.2020.2992621 [retrieved on Oct. 9, 2020].

(Continued)

*Primary Examiner* — Diane D Mizrahi

(74) *Attorney, Agent, or Firm* — INNOVATION CAPITAL LAW GROUP, LLP; Vic Lin

(57) ABSTRACT

The invention relates cloud based IoT network monitoring and validation to enable optimal network selection and connectivity for IoT sensors. The present invention relates to a system to measure the signal quality directly from the network module of IoT sensors. It comprises of an application programming interface (API) 105, a Network detection dongle 103, communication network 110, server 115, network modules of network operators and IoT sensors 120, to be deployed or installed. The invention also relates to a method for determination of signal strength from network module of IoT sensors, wherein the API 105 is configured to run network detection software to determine and validate an optimal location for IoT sensor/device installation or deployment based on the highest signal strength.

24 Claims, 25 Drawing Sheets

100

(56) References Cited

OTHER PUBLICATIONS

International Search Report & Written Opinion dated Sep. 13, 2022 from PCT Application No. PCT/US2022/071605.

Nivid Technologies: "A Mobile Platform for IoT Network Intelligence", Feb. 1, 2021 (Feb. 1, 2021), pp. 1-5, XP055937892, Retrieved from the Internet: URL:https://nsmart.io/wp-content/uploads/2021/02/Brochure-Nview.pdf [retrieved on Jul. 4, 2022].

* cited by examiner

| Command | Response |
|---|---|
| AT+QPING input format | AT+QPING= <Context id>,"IP address",<timeout>,<pingnum><br><br>****Note:***<br>**Context id:** Value set to 1.<br>**IP address: Test Server IP**<br>**Timeout:** Set to maximum time to wait for the response of each ping request (range 1-255)<br>**Pingnum:** Set the number of ping requests (range 1-10) |
| AT+QPING output format | Users will receive multiple response to ping request<br>+QPING:0,"IP Address",<bytes>,<time>,<ttl><br><br>Final result:<br>+QPING:0"<sent>,<rcvd>,<lost>,<min>,<max>,<avg>"<br><br><sent> Total number of sending the ping requests.<br><rcvd> Total number of the ping requests that received the response.<br><lost> Total number of the ping requests that are timeout.<br><min> The minimum response time. Unit: ms.<br><max> The maximum response time. Unit: ms.<br><avg> The average response time. Unit: ms.<br><br>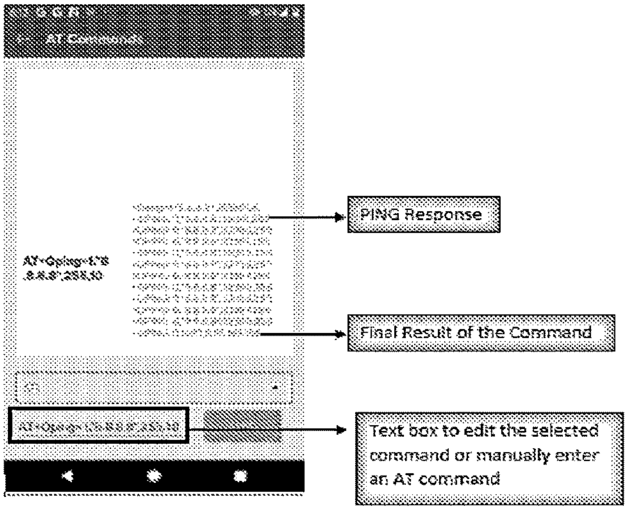<br> |

SYSTEM AND METHOD FOR IDENTIFICATION, SELECTION AND VALIDATION OF BEST NETWORK ACCESS FOR IOT DEVICES

FIELD OF INVENTION

The invention relates to IoT network, particularly cloud based IoT network monitoring and validation to enable optimal network selection and connectivity for IoT sensors. The invention relates particularly to network coverage monitoring at a given geographical location by an application programming interface (API) or a mobile platform based on determination of signal strength of available connectivity technologies. Specifically, the present technology is a mobile platform that monitors network intelligence to simplify IoT deployments and further evaluates different service providers and enables decision on both optimal location as well as best network for the deployment of IoT sensor.

BACKGROUND OF INVENTION

The Internet of Things (IoT) represents a new technological paradigm with large economic and societal implications. IoT has the potential to become a real game-changer for the attainment of sustainability goals as it can significantly contribute to optimizing energy usage, food production and supply as well as healthcare among others. Success of the IoT depends on devices capable of connecting with each other and the Internet. Connectivity-related technologies and standards enabling interoperability in this field are therefore of utmost importance.

Each IoT use case poses its own requirements for connectivity in terms of coverage, data rate, latency and energy efficiency. Rapid commercial launches of cellular technologies like NB-IoT, Cat-M1/M2, and LTEM coupled with lowering cost of mobile chipsets are driving the fast growth of cellular connected IoT devices. However, when it comes to deploying the growing number of IoT sensors, network operators are dependent on statistical modelling using terrain and clutter models. This leads to statistical variabilities. To deploy the wide variety of mobile IoT sensors such as water meters, electricity meters, parking sensors etc. there is no unified way to determine the optimal location with predictable connectivity SLAs. IoT will significantly affect all industries and ultimately everyone's daily routine. Many IoT applications will require global coverage and mobility, with focus on current 4G technologies, such as LTE-M and NB-IoT, and future 5G technologies so, expectations on the reliability, performance and quality of IoT devices are extremely high; and wireless connectivity will become a critical success factor for IoT.

Some of the challenges being faced by companies deploying IoT sensors at a large scale: Traditional sensor deployments are designed via statistical modeling which can lead to variabilities with the accuracy of the placement of the sensors. On an average, around 20% of the sensors deployed need a truck rolls to troubleshoot connectivity issues resulting in substantial operational costs and a direct impact on the ROI. Also, a vast number of low cost driven IoT modules, all showing different RF characteristics make it even more challenging. What's missing is a solution that validates with accuracy, the deployment of this wide variety of sensors on any given network.

The prior art so far disclosed traditional testing methods using bulky RF scanning tools for measuring RF signal levels and other parameters. These tools passively measure the air interface for all the available signals in a given location while some may have the capability to measure a specific service provider. This could lead to variabilities as the end devices consuming the service will have less powerful chipsets and antennas compared to the scanners used to do the measurement to determine the quality of a wireless service.

A substantial number of sensors do not connect with the network post deployment in any IoT solution leading to expensive truck rolls. Accordingly, there is a necessity for a solution that could determine data connectivity, network signal strength and optimal location for IoT sensor deployment. The present invention helps commercialize a low cost, portable and efficient IoT sensor deployment and connectivity solution for network operators and service providers to ensure network coverage and service quality in mission-critical IoT applications, accelerating installations, and time-to-revenue.

OBJECTS OF INVENTION

It is a primary object of the invention to provide an application programming interface to deploy IoT sensor based on Network coverage intelligence.

It is another object of the present invention to provide a system to measure the signal quality directly from the network module of an IoT sensor.

It is another object of the present invention to provide a method for determination of signal strength from network module of an IoT sensor.

It is another object of the present invention to provide a portable system for determination of signal and network quality in a given location and also implementable as a Mobile test tool.

It is another object of the present invention to provide a portable system for testing of network modules from different vendors or network operators.

It is another object of the present invention wherein the system enables the user devices to switch between different service providers or network vendors based on signal strength and network quality.

SUMMARY OF THE INVENTION

Thus, according to the present invention, there is provided a system for identification/detection, selection and validation of wireless network for IoT devices, comprising:

- an application programming interface (API)/mobile platform 105 at a user interface (UI) on a computer implementable device 102 at the user end;
- hardware kit/dongle or Network detection dongle 103;
- communication network 110;
- a server 115;
- one or more network modules of network operators/vendors; and
- one or more IoT sensors or devices to be deployed or installed 120,
  - wherein the API 105 is configured to run a network detection software on the server 115 when connected to the communication network 110 to provide real-time network intelligence insights, and
  - wherein the API 105 is installed on one or more computer implementable devices 102, when connected to the Network detection dongle 103 is configured to initiate the API, detect the signal strength of one or more connectivity technologies real time or near real time from one or more network modules of network operators/vendors, via the application programme interface 105 or a thin client within the module and then transferred to the server 115, to determine and validate an optimal location for IoT sensor/device installation or deployment based on the highest signal strength.

It is another aspect of the present invention to provide a system for identification/detection, wherein the server 115 comprises of Cloud server.

It is another aspect of the present invention to provide a system for identification/detection, wherein the server 115 further comprises of Geographic Information System (GIS).

It is another aspect of the present invention to provide a system for identification/detection, wherein the server 115 further comprises data science layer communicating through the cloud network 110 to provide real time data insight of one or more connectivity technologies.

It is another aspect of the present invention to provide a system for identification/detection, wherein one or more connectivity technologies comprises NB-IoT, LTE-M, 5G, LoRa, Sigfox and Wi-Fi.

It is another aspect of the present invention to provide a system for identification/detection, wherein the data insight comprises signal strength of the connectivity technology.

It is another aspect of the present invention to provide a system for identification/detection, wherein the data insight further comprises of location data with precise location coordinates providing highest network signal strength of one or more network operators.

It is another aspect of the present invention to provide a system for identification/detection, wherein the server 115 further comprises of an analytics engine 111 to determine the IoT signal performance real-time or near real time to the cloud server 115 and the data from the sensor network module is sent in near real-time to the backend server and the backend server performs the data processing and modelling to provide analytics that will be displayed on the frontend dashboard 130.

It is another aspect of the present invention to provide a system for identification/detection, wherein the analytics engine 111 is configured to process the real-time data of the IoT sensor performance and communicates to the server 115 for storage and the API 105 is configured to extract and display the IoT sensor data at user interface on a cloud dash board 130.

It is another aspect of the present invention to provide a system for identification/detection, wherein the system further comprises of a display module 114 configured to display the analytics data real-time at the user interface at the cloud dashboard 130.

It is another aspect of the present invention to provide a system for identification/detection, wherein the optimal location is determined either by an inbuilt GPS in the network module of the dongle 103, or acquired from the location detection module on the cloud server 115 in communication with network 110 configured to detect signal strength at predefined locations.

It is another aspect of the present invention to provide a system for identification/detection, wherein the computer implementable device comprises of one or more of laptop, mobile, smart devices or any other device.

It is another aspect of the present invention to provide a system for identification/detection, wherein the Network detection dongle 103 further comprises of a network module 142 with a SIM slot and serial connectivity, a conversion board with USB or Controller 141 wherein the, LTE/GPS/GNSS PCB antenna 134 and eSIM 140, and when the Network detection dongle 103 is connected to initiate the API 105 installed on computer implementable device 102, detects the signal strength of one or more connectivity technologies 125 in real time or near real time from one or more network modules of network operators/vendors 127, to determine and validate an optimal location for IoT device module 120 installation or deployment based on the highest signal strength.

It is another aspect of the present invention to provide a system for identification/detection, wherein the eSIM 140 configurations are enabled on the provisioning window of the cloud dashboard 130, and wherein the eSIM 140 is configured to switch between one or more connectivity technologies based on network signal strength.

It is another aspect of the present invention to provide a system for identification/detection, wherein the network module 142 comprises Mini PCI-E or M2 based network module inserted or latched on the board 141 and connected via USB or Bluetooth to the application 105 on the device 102.

It is another aspect of the present invention to provide a system for identification/detection, wherein the conversion board 141 comprises Mini PCI-E to USB (SIM Slot) adapter.

It is another aspect of the present invention to provide a system for identification/detection, wherein the system is configured to detect/determine optimum location for IoT sensor installation.

It is another aspect of the present invention to provide a system for identification/detection, wherein the system provides on-site network coverage measurements real-time or near real-time from the IoT device module 120.

It is another aspect of the present invention to provide a system for identification/detection, wherein the API 105 is configured to command the IoT sensor module to run tests for Network QoS and evaluates the results.

It is another aspect of the present invention to provide a system for identification/detection, wherein the system is configured to provide network insights in both stationary and mobile mode.

It is another aspect of the present invention to provide a system for identification/detection, wherein the system is configured to validate RF design and network key performance indicators (KPIs) using cloud-based analytics dashboard.

It is yet another object of the present invention to provide a method of identification/detection, selection and validation of wireless network for IoT devices, comprising steps:

connecting of the communication dongle or hardware kit/dongle or Network access detection dongle to a computer implementable device at the user end;

authentication of the user at the user interface (UI) of the device 102;

user selection of the location navigator;

wherein the API is configured to navigate the location in stationary mode or mobile mode, establishing device connectivity with a communication network;

extraction of IoT sensor/device data real-time from one or more IoT modules 120 and communicating to the server 115 on the network 110;

processing of the IoT module data real time or near real time by the processor in the server;

display of the network connectivity and device data real-time or near-real time on cloud dash board by the display module in the cloud network; and completion of the test, wherein the test results are displayed as one or more of location data, network data, signal strength, enabling the user to identify, select the network of optimal signal strength, and wherein the method further comprises of display of signal strength with location data in the cloud dash board.

It is yet another object of the present invention to provide a method of identification/detection, selection and validation of wireless network for IoT devices wherein the method further comprises of providing to the user real-time data from the IoT sensor for performance.

It is yet another object of the present invention to provide a method of identification/detection, selection and validation of wireless network for IoT devices wherein the network data comprises of one or more of network operator information, network mode, Received Signal Strength Indicator (RSSI), Reference Signals Received Power (RSRP), Reference Signal Received Quality (RSRQ), Signal-to-interference-plus-noise ratio (SINR), KPI's, Network parameters and the like.

It is yet another object of the present invention to provide a method of identification/detection, selection and validation of wireless network for IoT devices wherein the network data is represented as Key process indicators (KPIs') comprising one or more of RSRP, RSSI, RSRQ, RSSNR, Downlink, Uplink data.

BRIEF DESCRIPTION OF DRAWINGS

FIG. 17: displays on home screen the PING test to test the Internet protocol reachability of a host.

DETAILED DESCRIPTION OF THE INVENTION ACCOMPANYING FIGURES

Definitions

Figure 1:
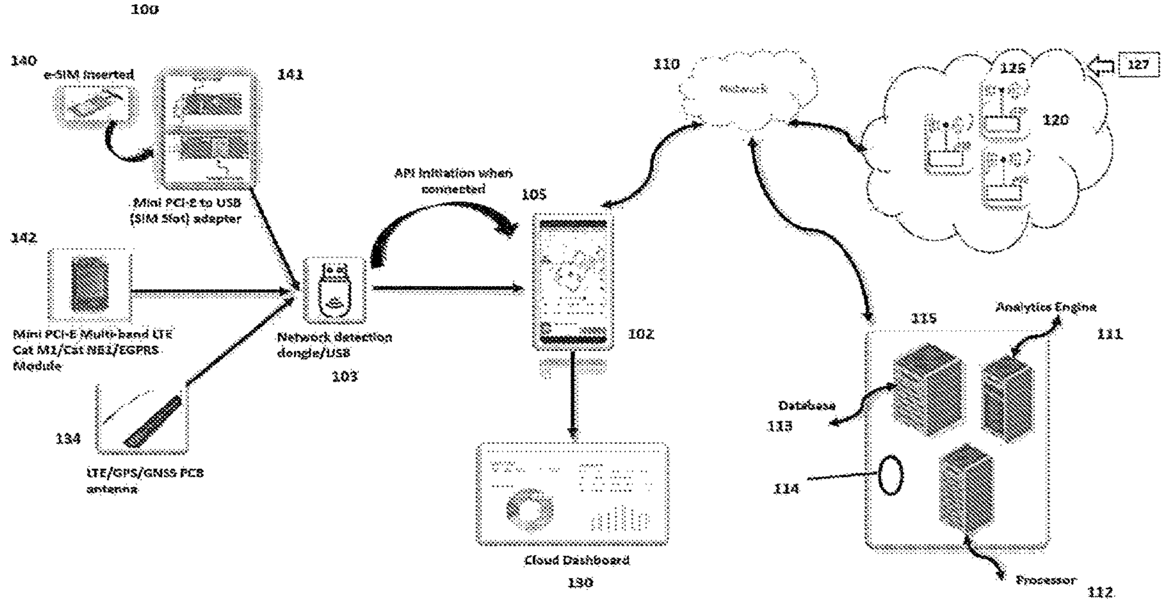
FIG. 1: Illustrates the System Architecture diagram 100 displaying various hardware elements configured to perform the method of the present invention.

N-View® The term N-View is a trademark of the application programming interface (API) or mobile platform according to embodiments of the present invention. The terms N-View and API/mobile platform and application programming interface are used interchangeably and refer to the same application.

User is an installer or technician or any person running the app on any computer implementable device to determine the network coverage and performance on any connected network at a given geographical location.

USB dongle in embodiments of the present invention refers to Network detection dongle or kit or test kit 105.

Computer implementable devices according to embodiments of the present invention refer to laptop, mobile, smart devices or any other device.

N-View® is configured to identify or detect the optimal signal strength of the network. N-View both identifies networks of optimal strength and detects their presence in a given geographical location of interest.

The terms Cellular technologies or Connectivity technologies or sensor technologies refer to one or more connectivity technologies and used interchangeably.

The detailed description set forth below is intended as a description of various configurations of the Subject technology and is not intended to represent the only configurations in which the Subject technology can be practiced. The appended drawings are incorporated herein and constitute a part of the detailed description. The detailed description includes specific details for the purpose of providing a thorough understanding of the Subject technology. However, it will be clear and apparent to those skilled in the art that the Subject technology is not limited to the specific details set forth herein and can be practiced using one or more implementations. In one or more instances, well-known structures and components are shown in block diagram form in order to avoid obscuring the concepts of the subject technology.

It is difficult to guarantee a satisfactory level of service to customers at all times if the IoT devices fail to deliver due to poor connectivity. Embodiments of the present invention allow a user to test how robust the network coverage is, using a number of connectivity parameters before a user determines the ideal location to deploy the IoT sensors. N-View is the mobile platform configured to keep track of the network performance in the context of the initial SLAs after deployment. Aimed to minimize the need to dispatch technicians for troubleshooting, ensure the expected level of service which contributes to superior customer experience and loyalty. The present invention addresses key issues in the field of IoT based devices and data connectivity.

The cost and inefficiencies to remediate problems due to poor connectivity is substantial. For example, when a thousand connected parking meters are deployed in a city block, and 20% of the locations have poor connectivity, the number of truck rolls and associated cost is significant. N-View is a low-cost solution to measure and determine the ideal deployment spots in advance to improve a user's deployment efficiencies.

The ability to test and assess optimal connectivity in advance enables a user to: Reduce the time needed to deploy IoT sensors; reduce the number of truck rolls; provide a high degree of confidence in a user's deployment and runtime performance; and improve customer experience to reduce churn rate. The present invention is designed to accelerate sales by simplifying a user's IoT deployment process. NB-IoT supports multiple frequency bands for uplink and downlink. The ability to determine ideal sensor locations using N-View gives a user the control to design load balancing and thereby improve capacity efficiencies. The present invention's network health data can validate a user's network and design assumptions based on statistical models. N-View's analytics platform gives a user the visibility to compare different markets and their performance to monitor current operations and to plan for the future.

Embodiments of the present invention relates to systems and method for identification/detection, selection and validation of wireless network for IoT sensors/IoT devices. In reference to FIG. 1, the present invention discloses a system 100 for identification/detection, selection and validation of wireless network for IoT modules in IoT devices 120. An embodiment of the present invention discloses a system 100 comprising an application programming interface API/mobile platform 105 installed in a computer implementable device 102 at a user end, a hardware kit/dongle or Network access detection dongle 103, a network 110, a server 115, one or more network modules of network operators 127 providing cellular connectivity through one or more connectivity technologies 125, one or more IoT sensors or devices to be deployed or installed 120. The mobile platform 105 according to embodiment of the present invention is configured to connect real-time or near real-time to available networks in the given geographical location via a serial interface. The mobile platform is implementable on operating systems comprising Android.

In one implementation the API or mobile platform 105 refers to an application programming interface 105 installed in one or more computer implementable devices 102 to determine network intelligence insights at any given geographical location in both stationary mode and Mobile mode. The mobile app-based platform 105 simplifies IoT deployments by adding network intelligence. It simplifies the way optimal locations with accuracy to deploy IoT sensors based on network coverage intelligence are determined.

With a simple click of a few buttons using the user-friendly UI 102, a user can measure the RF and network parameters directly from the network module of an IoT device 120. In another implementation it may also measure or read the near real time data from a thin client within the module and then transfer to the cloud 115.

It is a simple mobile application tool to measure the RF coverage and the network performance in a particular location for a connected network and it can also be used as a mobile test tool to get the measurements along a given path.

Embodiments of the present invention discloses a system 100, wherein the signal quality is directly measured or detected from the network module of an end-device (IoT) 120 by using a mobile application 105 when connected via serial interface 103 (USB, Bluetooth, or other wireless connections) to the network modem in the device 102.

The Network dongle 103 is a hardware base board with USB 141, Bluetooth capabilities and an interface slot to plug in a network module or modem along with an e-SIM card slot. The network module in the dongle 103 in exemplary embodiments may be selected from IoT network modules comprising Quectel BG96, SIMCOM 7000 U-Blox SARA 410, SIERRA Wireless WP7700 series, Gemalto EX62/82-W, Nordic nRF9160 and the like. Also, provided is an USB cable for connectivity to any computer implementable device 102 or as provision for charging the USB dongle 103. It has a pluggable slot and an antenna 134, which when connected to the computer implementable device 102 installs the API 105 on the device. On installation of the App or the mobile platform 105, the user is authenticated by an authentication module of the API. The system is configured to detect the signal strength of one or more connectivity technologies 125 real time or near real time from one or more network modules of network operators/vendors 127, determine and validate an optimal location for IoT sensor installation or deployment based on highest signal strength. The network dongle 103 has a pluggable slot that can be used to test the network modules/modems from different vendors 127. The advantage of this that a service provider or network operator can measure the performance of connectivity technologies from different vendors and pick the best performing module/modem vendor for their solution.

USB interface or Network access detection dongle USB 103 of the present invention is configured to connect to the mobile application N-View® 105 on the device via USB or Blue tooth serial interface over a network 110.

The Network detection dongle 103 in an exemplary embodiment comprises: A mini PCIe based network module 142 (the same module which is typically used in a sensor) that connects to the wireless service provider 110.

A Mini PCI-E or M2 base board or Conversion board 141 with a SIM slot and serial connectivity. The conversion board 141 with USB or Bluetooth controller enables serial connectivity between the network module 142 and the device, exemplified by a mobile 102.

The Mini PCI-E to USB (SIM Slot) adapter 141 comprises a Network module 142 latched on top of it. The module 142 may also be configured to be inserted into the board 141 which in turn is connected via USB cable or Bluetooth to the application 105 in the mobile phone 102. A serial/UART connection from the network module 142 to the phone 102 is established. The N-View® uses the serial interface to send commands and receive info. The dongle further comprises LTE/GPS/GNSS PCB antenna 134 with optimal antenna gain and frequency range, so when the network detection dongle 103 is connected to initiate the API 105 installed on computer implementable device 102, it detects the signal strength of one or more connectivity technologies 125 in real time or near real time from one or more network modules of network operators/vendors 127, to determine and validate an optimal location for IoT device module 120 installation or deployment based on the highest signal strength via the e-SIM 140. The e-SIM 140 provides the capability of unrestricted roaming and connectivity for any device to any global carries automatically.

e-SIM 140: The dongle as illustrated in the system 100 in FIG. 1, comprises e-SIM 140, wherein the e-SIM can be inserted and implemented via mobile application provisioning window in dashboard 130 to configure IoT module and the SIM. N-View utilizes next generation e-SIM/e-UICC technology offered by global vendors enabling data connectivity for smart devices all over the world. e-SIM is activated once inserted into IoT module 142 of the network detection dongle 103.

The e-SIM is enabled for data and PDP on the IoT device 102 using "Provisioning window" feature in N-View mobile application 105. The device is allowed to connect automatically to the network with no APN defined. If the device requires manual configuration of the APN, then APN setup option is used in the "provisioning window" again. A connection will automatically be established as with any standard SIM. This can be verified by executing commands from the set of commands already given or user can execute ant AT command manually as well using N-View mobile application.

Kit or dongle 103 also includes extra RF cable provisioning the connection of external LTE RF antennas 134 with higher gains. The network module of the dongle 103 may further comprise an inbuilt GPS tracking capability from which the latitude and longitude data is captured. The GIS is required for overall solution for locations of sensors and maps.

In reference to FIG. 1, that describes a particular embodiment of the present invention discloses systems and method for identification/detection, selection and validation of wireless network for IoT sensors/IoT devices. The system 100 for identification/detection, selection and validation of wireless network for IoT modules in IoT devices 120 wherein the IoT network module 120 is a sensor network which is communicatively coupled to the communications network 110. In a preferred embodiment the communication network is a Cloud Network 110. The IoT modules 120 are connected to the cloud 110 through various mediums of communication and transports such as cellular networks, satellite networks, Wi-Fi, Bluetooth, wide-area networks (WAN), low power wide area network and many more. Exemplary embodiment of the present invention discloses an IoT sensor or module on an IoT device 120 connected to the network 110 via cellular network or connectivity technologies 125 selected from one or more of NB-IoT, LTE-M, 5G, LoRa, Sigfox and Wi-Fi.

In reference to FIG. 1, system further comprises a server 115 on a network 110 in communication with the IoT modules of the IoT devices 120 for installation according to embodiments of the present invention. The server 115 comprises of a database 113 for data storage, an analytics engine 111 and a processor 112 to process data. The data according to embodiment of the present invention is the IoT sensor data (from 120) captured real-time or near real-time. The server further comprises of a data science layer and GIS. The data science layer communicates through the cloud network 110 to provide real time data insight of one or more connectivity technologies 125. The cloud 110 is configured to receive data from a plurality of connectivity technologies 125 enabled sensors or IoT modules 120 for analytical review to build a network and efficiently manage the network and provide feedback from the modules 120, which is delivered to the user at the UI or user interface 102 on a cloud dashboard 130 via cloud. The data to be displayed is processed by display module 114 of the processor in the server 115. The data insight comprises signal strength of the connectivity technologies. The analytics engine 111 is configured to receive the data from the sensor network module of the IoT device 120. This transmission can occur on a periodic basis. Present invention is configured to provide data insights real time or near real time. The analytics engine comprises an analytics data store to store the transmitted data from the IoT device 120. The analytics engine 111 receives and stores in memory or database 113 both historical data and live or real time or near real time data. This data is processed by the data processor 112 in the server when a connection with N-View 120 is established. The data processing is triggered by initiation of the API N-View® on the computer implementable device 102, the server 115 is configured to process and model the data at the analytics engine to provide the analytics that is displayed at the cloud dashboard or front end dashboard 130. Data comprises both real-time and historical data and customized at the API to choose, the data may further also include historical data from another IoT device that is in the same group as the requesting IoT device 120. For example, if there are two IoT units on the same street, the data from the non-requesting unit can also be sent with the request.

The cloud dashboard 130 is implemented on the UI 102 can display various assessments of network signal and mode in both graphical and visual representations using color coding as well as cloud-based analytics with multiple dashboard views to provide insights, compare markets, and plan new sites or deployments. The dash board 130 is communication with the cloud network 110 displays the data derived from the processing of the IoT sensor 120 data collected real-time by the processor 112 in the server 115 and stored in the data base 113. In one implementation the dashboard provides settings option, which provides the customer one or more options to use N-view application 105 to customize the data to be displayed on the dashboard 130.

Figure 19:
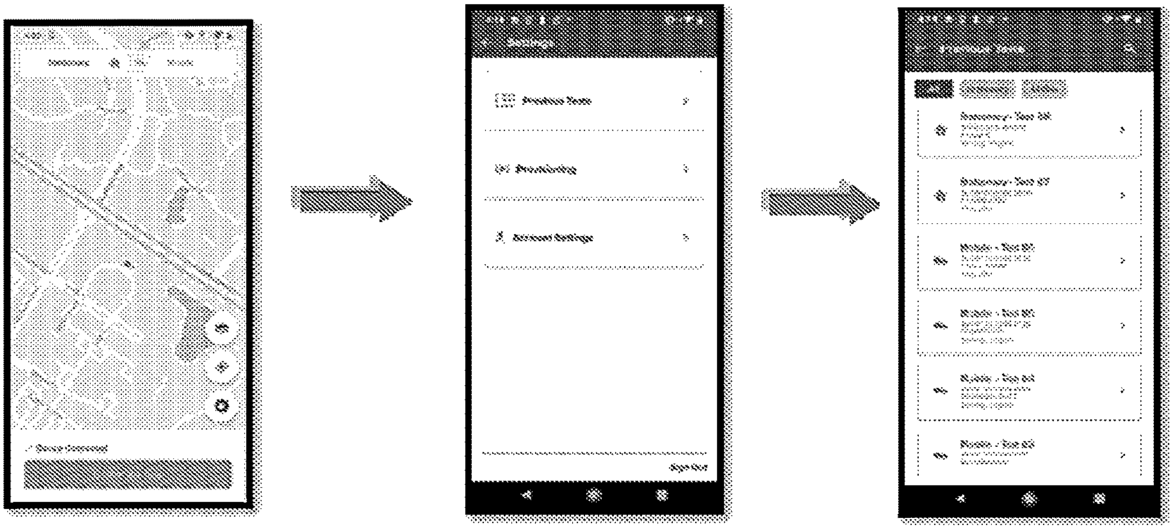
FIG. 19: Illustrates Selection of the Settings icon ⚙ at the bottom of the main screen to view the test logs.

Settings: The Settings button ⚙ appears on each of the main screens. When user selects the ⚙ icon, the settings appear (FIG. 19). The Settings screen consists of the following options Previous tests: The user can view the log of all previously performed tests.

Figure 30:
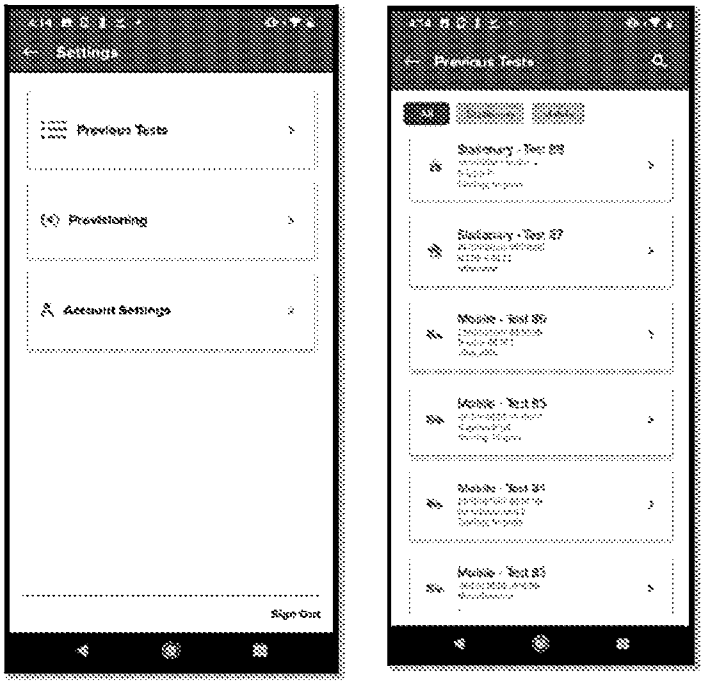
FIG. 30: Illustrates display of settings button ⚙ on each of the main screens which when selected the ⚙ icon, the settings appear and user view of the log of all previously performed tests also enabling user to select log of all the previously performed tests
Figure 31:
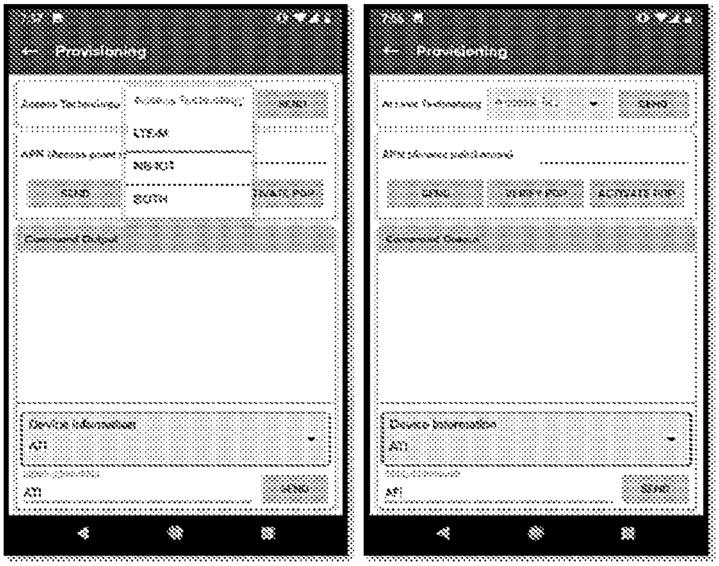
FIG. 31: Illustrates the home screen for Provisioning: wherein the user can view and select various options like access technology, APN name, PDP activation and perform sim provisioning, it further provides the user option to perform multiple commands to validate and troubleshoot network registration

Provisioning: Here, the user can view and select various options like access technology, APN name, PDP activation and perform SIM provisioning. Also, the user can perform multiple commands to validate and troubleshoot network registration (illustrated in FIG. 30, FIG. 31).

Figure 32:
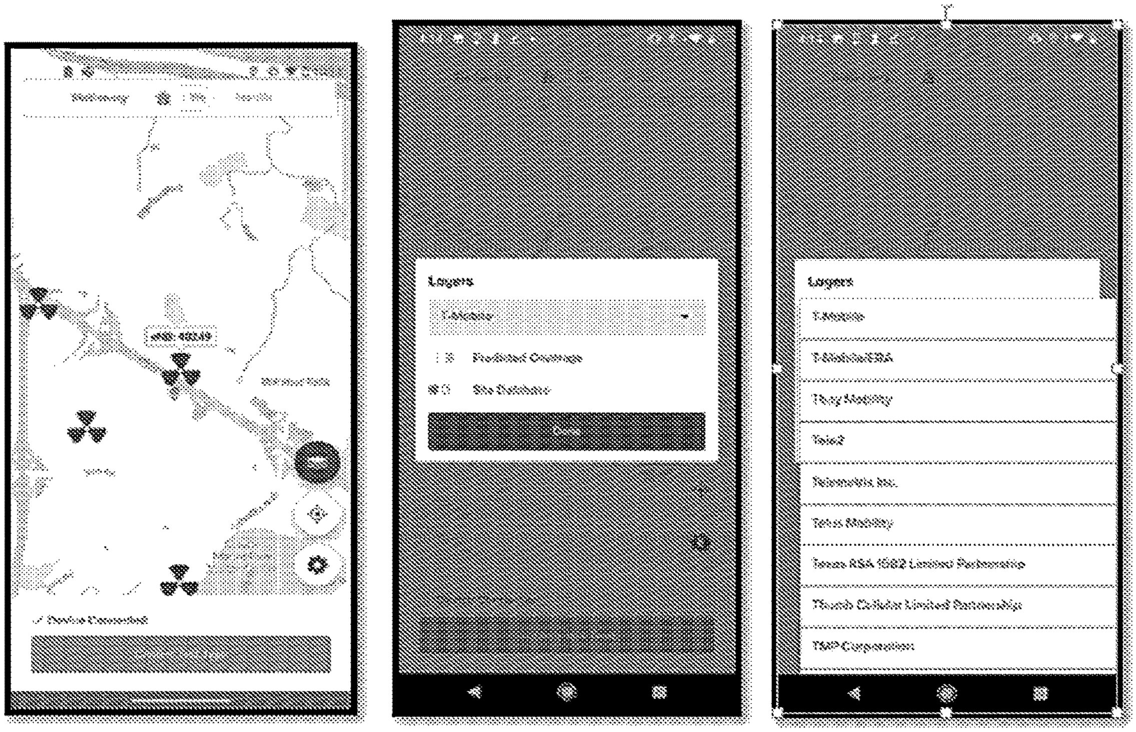
FIG. 32: Illustrates the options for Selection of the Layers icon available on the test screen to view the different Operators, user selects the required Operator from the list. Users can view the Cell tower information with corresponding cell ID for the selected operator.

Layers icon: (FIG. 32)

Selection of the Layers icon available on the test screen to view the different operators. Selection of the required Operator from the list. Users can view the Cell tower information with corresponding cell ID for the selected operator.

Figure 33:
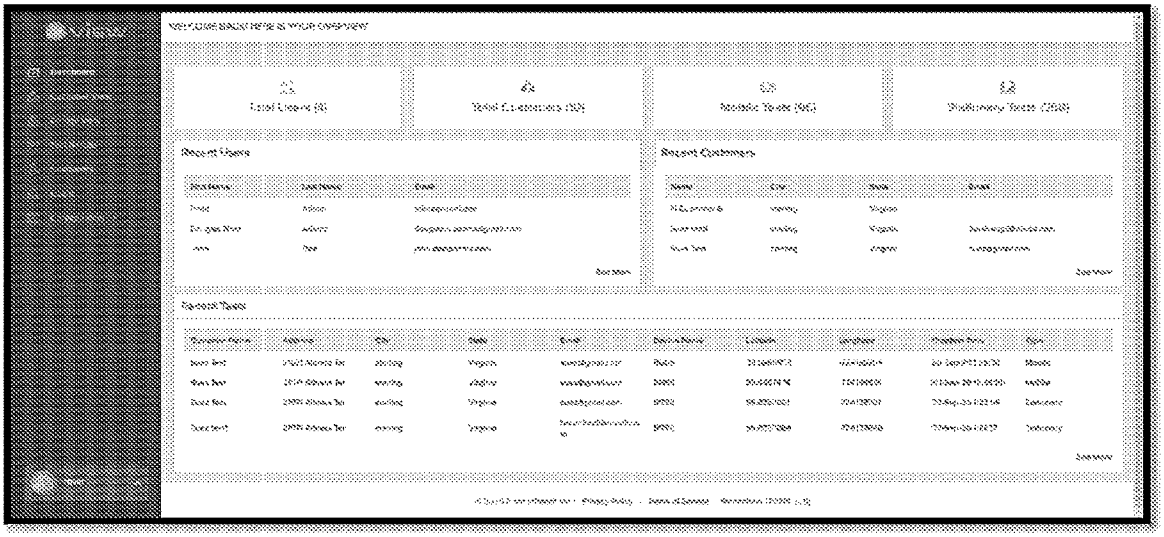
FIG. 33: Illustrates dashboard overview wherein the Users view recent updates and activities, providing an overview of recently saved tests recent users and recent customer data.

In a Dashboard view as illustrated in FIG. 33, the cloud dash board 130 after user authentication is configured to display recent updates and activities, which provides an overview of recently saved tests, recent users who have logged in and recent users who have used the application under the Dashboard option on the side bar.

Figure 34:
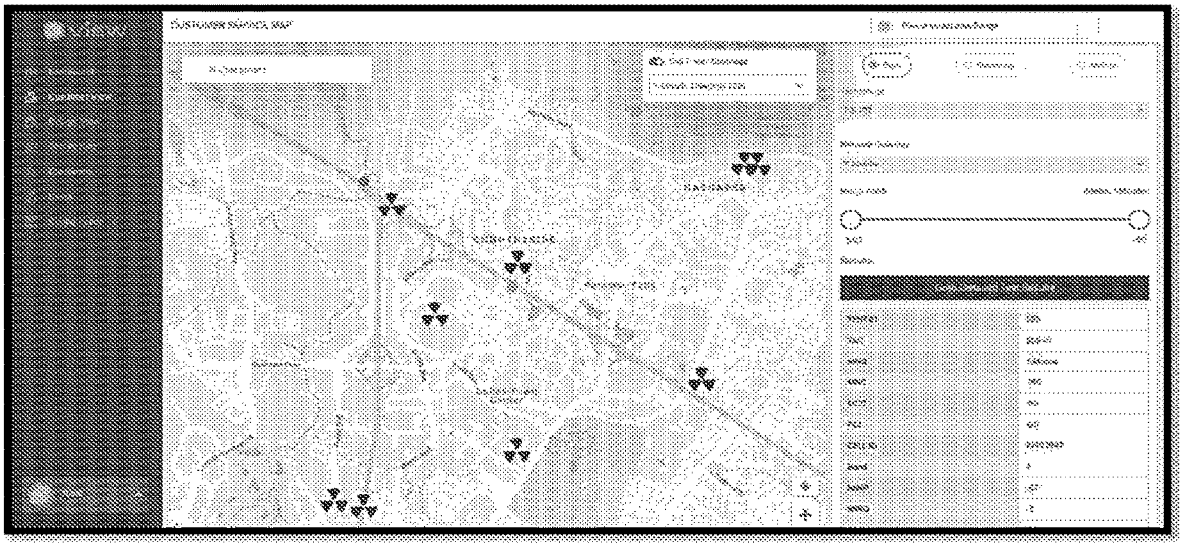
FIG. 34: Illustrates dashboard view for user to view a brief version or a detailed version of a test conducted by a particular customer. Provision for user to select customer and operator is provided.

In the customer or user view mode the cloud dashboard 130 is configured to display a detailed version of a test conducted by a particular customer/user. Users can select the customer and the operator for which the results need to be viewed using the dropdown menus for each, as shown in FIG. 34.

Preferred embodiment of the present invention discloses a system 100 which is configured to be enabled in two modes, a stationary test or survey mode and Mobile Survey mode. The term survey and test are used interchangeably and are provided to indicate that the API 105 is configured to test the network connectivity from one or more network connections providing different cellular technologies and indicate the signal strength and quality along with the vendor data. Terms vendor and Network Operator 127 are used interchangeably. Cellular technologies or Connectivity technologies 125 or sensor technologies according to embodiments of the present invention comprises NB-IoT, LTE-M, LoRa, 5G and the like.

Another embodiment of the present invention discloses a method 200 for determination of signal strength directly from IoT sensor network module 120 using the system 100. The parameters for measurement are the network modem related information comprising RF signals, cell tower info, network strength or quality and the like. The system 100 is configured to detect the signal strength of one or more connectivity technologies in real time or near real time from one or more network modules of network operators/vendors, to determine and validate an optimal location for IoT sensor/device installation or deployment based on the highest signal strength via the e-SIM.

Figure 2:
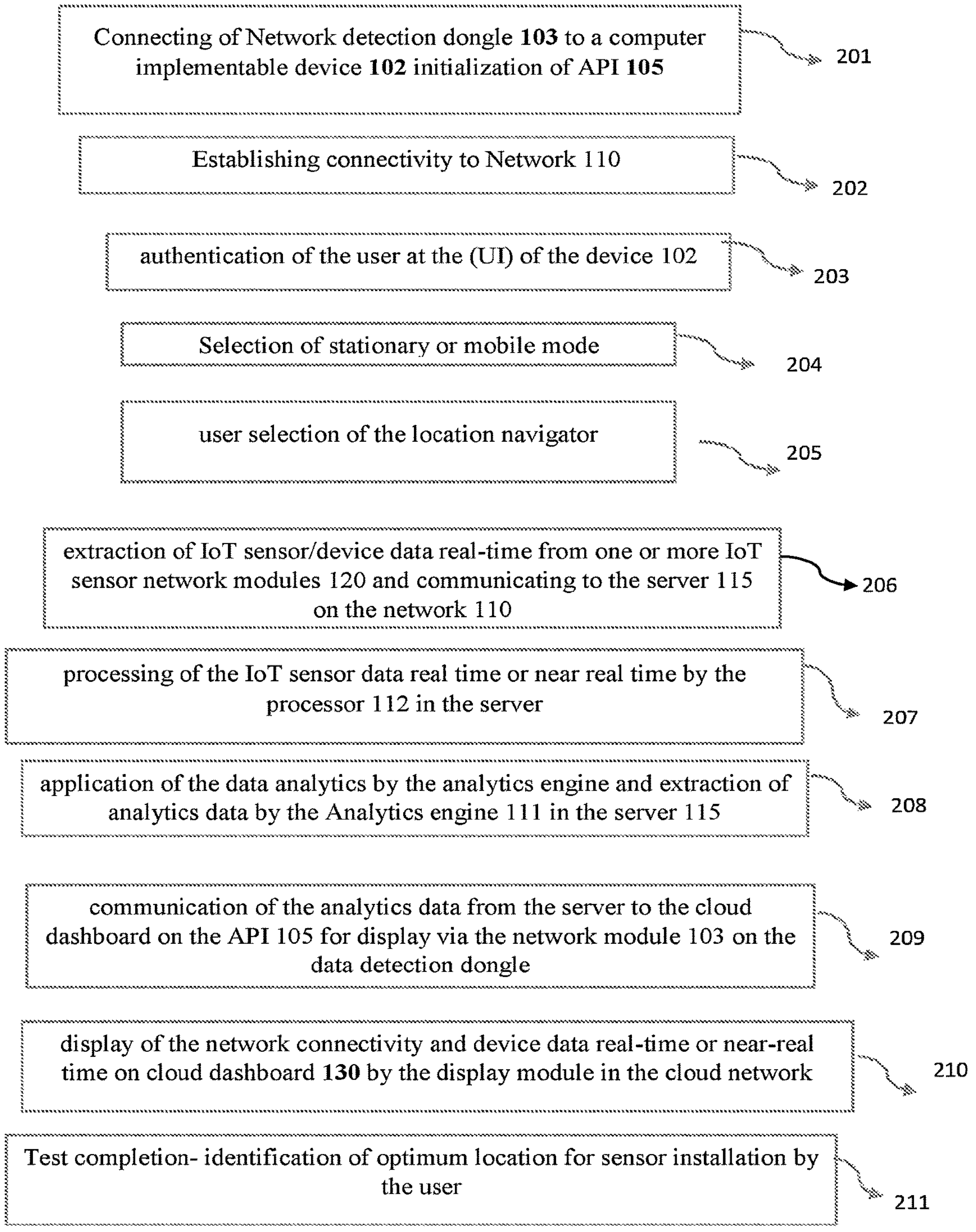
FIG. 2: Illustrates the method 200 for identification/detection, selection and validation of wireless network for IoT sensors/IoT devices
Figure 3:
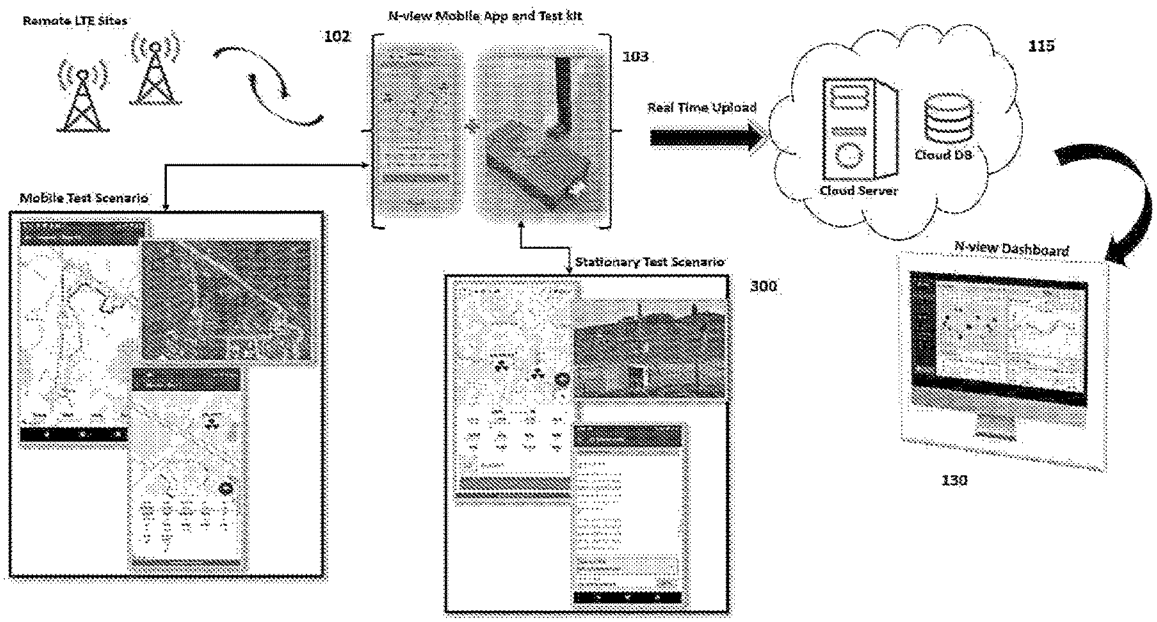
FIG. 3: Illustrates the System Architecture diagram 100 displays images of various hardware elements configured to perform the method of the present invention

FIG. 2 illustrates Method steps 200 performed by the system 100 on initiation of the API 105 at the UI 102 on plugging the data detection dongle 103. At the start, the USB dongle 103 is plugged into the computer implementable device 102 using the cable or wireless via Bluetooth, initiates the API or the mobile platform (N-View®) for detection of signal strength of one or more connectivity technologies. The API 105 establishes connectivity to a wireless network 110, disclosed in embodiments as active internet connectivity.

As discussed in embodiments for system. The establishment of connectivity between the dongle 103 and the mobile application 105 comprises steps wherein the network module on the dongle 142 is preferably a mini PCIe based network module (the same module which is typically used and it connects to the wireless service provider 110. The conversion board 141 in dongle with USB or Bluetooth controller enables cellular connectivity between the network module 142 and mobile 102. This is also aided by the e-sim 140 and Mini PCI-E or USB adapter 141. The network module is configured to be inserted A serial/UART connection from the network module to the phone 102 is established. The N-View® uses the serial interface to send AT commands and receive info.

The API 105 is enabled by series of computer readable instructions which when executed by the processor in the device 102, performs the method of the system as described herein. The steps of the N-view are executed on the user device, in conjunction with the components and processing on the network detection dongle 103. On establishment of data connectivity to a network 110, the network detection dongle 103 is configured to extract network data real time or near real time directly from the IoT module of the IoT device 120 to be installed. Once connected the N-View application 105 is initiated on the computer implementable device 102. On user registration and authentication of credentials at the N-View dashboard on the UI 102, the system 100 is configured to run the programme and perform the method steps for detection, identification and validation of the various connectivity technologies from one or more network providers or vendors. The present invention is configured to provide network insight as data on the cloud dash board 130 directly from the network module of the IoT devices 120 to be installed. The method is enabled by the programme or a set of computer executable instructions which when run caused the various KPIs, RFs and network parameters to be captured from the network module of IoT directly to the cloud dash board in the mobile app using AT commands.

Sequence of Method steps comprises: (FIG. 2) the method is providing the figures corresponding to stationary mode as general use case.

Connecting 201 of the USB dongle 103 with network module 133 connecting to wireless service provider or active network 110 (FIG. 5) described above.

Figure 6:
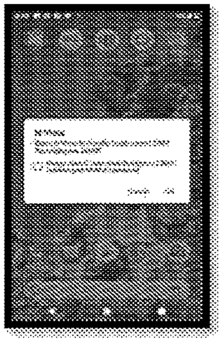
FIG. 6: Illustrates initiation of the mobile application 105 as N-View application notification.
Figure 11:
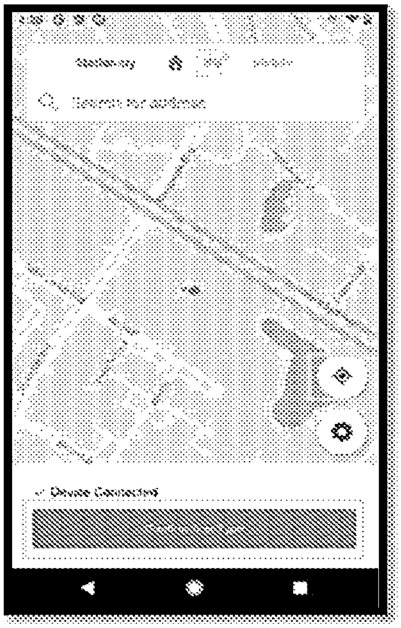
FIG. 11: Illustrates home screen for selection of optional location using the location navigator

Establishing 202 connectivity of dongle 103 with API 105 (FIG. 6);

User authentication 203 (FIG. 7, 8), and selection 204 of stationary (FIG. 9, 10) or mobile mode on the mobile platform 105 (FIG. 20); user selection 205 of location navigator (FIG. 11) in the application interface 102;

Extraction 206 of IoT sensor/device data real-time from one or more IoT modules 120 and communicating to the server 115 on the network 110 comprising determining of network data by the app 105 sending AT commands to the network module on IoT device 120, capturing output from the device module 120, parsing the information and providing network intelligence data insights at the cloud dashboard 130.

Figure 15:
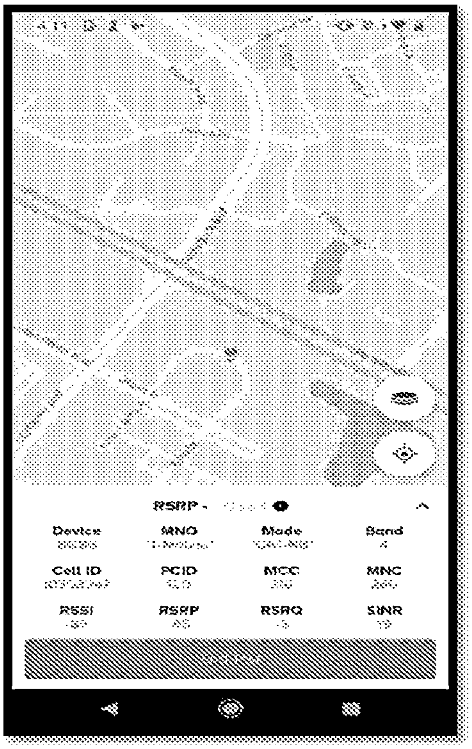
FIG. 15: Illustrates display parameters on successful test completion.

Processing 207 of the IoT sensor data real time or near real time by the processor 112 in the server comprising steps wherein the network module of IoT 120 sends real-time data to the server, storing of the data comprising real-time and historical data is configured in the database 113 on the cloud 115. The data is uploaded on server 110 in the database and is configured to be retrieved either real-time or as historical data according to the use case, on initiation of the application. Application of data analytics 208 on the acquired data wherein the server comprising the analytics engine 111 with a data science layer, is configured to extract network intelligence data of the corresponding IoT device 120, when a user initiates the application 105 at UI 102, the analytics engine 111 further provides data analytics and communicates 209 the information via the module on the dongle 103 to the cloud dashboard 130 for display 210. The dash board 130 is configured to generate and display coverage maps based on the RF results historically captured. This is a broad implementation of the method 200 on a system 100 of the present invention. Completion 211 of the test to provide insights on the optimum signal strength and the location data for IoT device installation. The method provides network data intelligence, wherein the network data comprises of one or more of network operator information, network mode, Received Signal Strength Indicator (RSSI), Reference Signals Received Power (RSRP), Reference Signal Received Quality (RSRQ), Signal-to-interference-plus-noise ratio (SINR) and is represented as Key process indicators (KPIs') comprising one or more of RSRP, RSSI, RSRQ, RSSNR, Downlink, Uplink data. (FIG. 15, 16).

Exemplary embodiment discloses the Technological fact sheet of the Mobile platform or application 105 (N-View®) in table 1.

TABLE 1

| | |
|---|---|
| MOBILE APP OPERATING SYSTEM | ANDROID |
| CELLULAR TECHNOLOGY | LTE-M, NB-IoT, Cat-M1/M2, LoRa, 5G/Wi-Fi |
| DEVICE SUPPORT | Compatible with all major chipsets |
| MEASUREMENTS | Ping Tests, Latency |
| TEST KPIS | RSRP, RSSI, RSRQ, RSSNR, Downlink, Uplink |
| SUPPORTED PROTOCOLS | ICMP, TCP, MQTT, HTTP |
| UI/UX DESIGN | High-level of abstraction (color codes, legends) |
| NETWORK ANALYTICS | Cumulative and Probability density functions |

Figure 16:
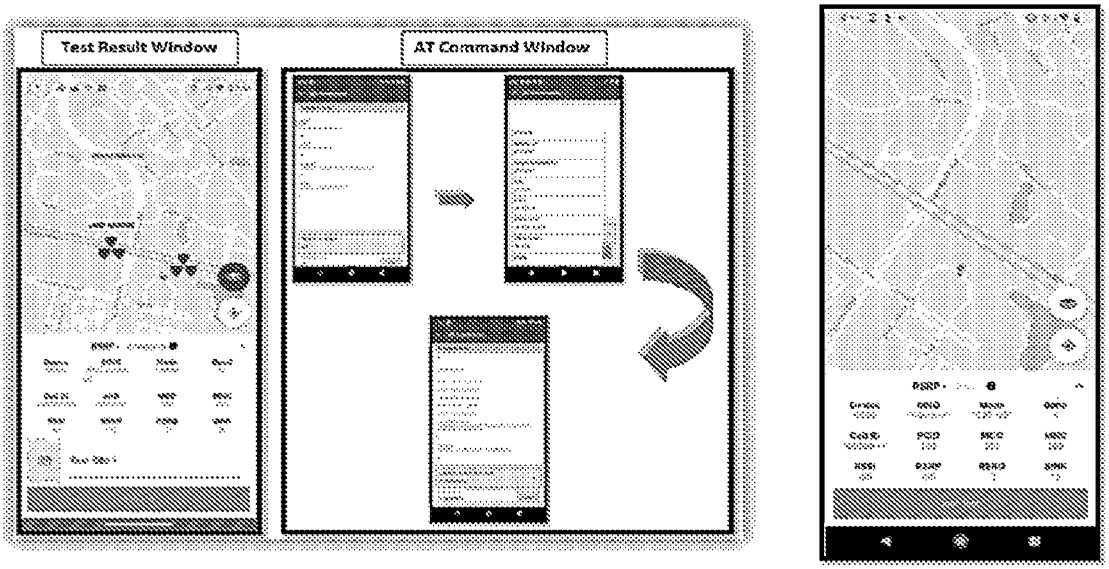
FIG. 16: Illustrates the home screen displaying nearby Cell Tower location with corresponding eNB information for results validation, users can select the Layers option and AT command window.
Figure 18:
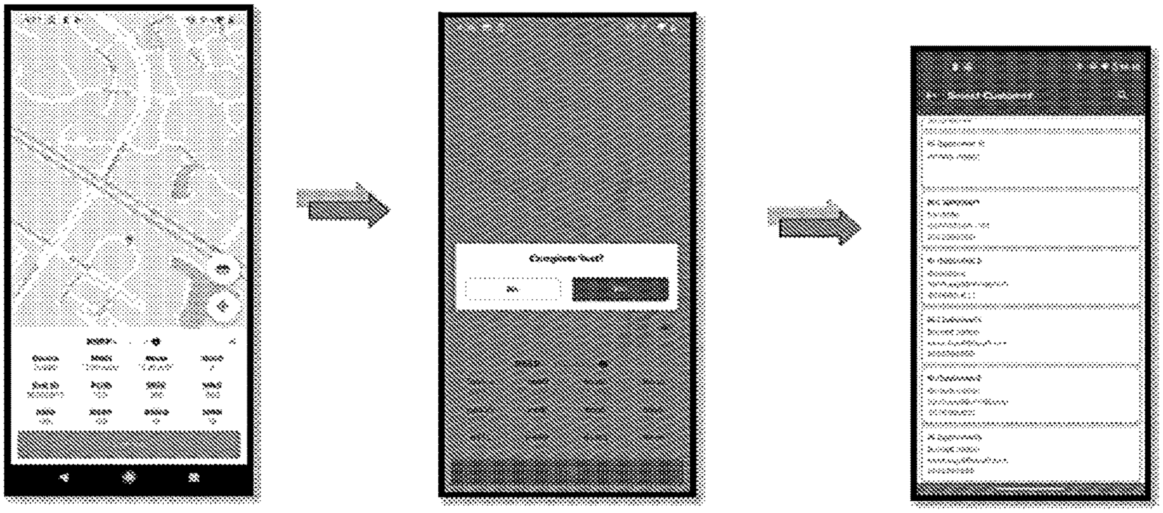
FIG. 18: Illustrates home screen depicting End Test option on the test screen and Illustrates home screen depicting Yes to confirm test on test screen.

Exemplary embodiment in stationary mode and reference to FIG. 15 discloses the following information: Device info, MNO information, Mode, Band, RSSI, RSRP, RSRQ and SINR after test in Stationary mode on the N-View Cloud dashboard. The method is configured to provide additional data like nearby Cell Tower location with corresponding eNB information for results validation, users can select the Layers option in the dash board as illustrated in FIG. 16.

Need steps of communication between app and dongle a. The USB dongle 103 with the network module 142 connects to a wireless service provider or vendor 127.
b. The dongle 103 is connected to the mobile app (N-View®) 105 via USB or Bluetooth serial interface 141.
c. Various KPIs and RF, network parameters are captured from the network module 142 on the dongle 103 using AT commands sent from the mobile app 105.
d. The app 105 communicates with the network module 142 via the USB/Bluetooth serial interface 141.
e. The app 105 sends the corresponding AT commands to the module 142 captures the output from the module and parses the information from the module to provide insights to the end user.
f. It detects the signal strength of one or more connectivity technologies 110 in real time or near real time from one or more network modules of network operators/vendors, to determine and validate an optimal location for IoT sensor/device installation or deployment based on the highest signal strength via the e-SIM 140.
g. The results will be saved and uploaded to the cloud database.
h. The dashboard shows both live and historical test data.
i. The dashboard can generate coverage maps based on the RF results historically captured the app communicates with the network module via the USB/Bluetooth serial interface.

j. The app sends the corresponding AT commands to the module captures the output from the module and parses the information from the module to provide insights to the end user.

Multiple implementations may have one or more components that are further enable improved performance of the system. For e.g., in one implementation the network module may have an inbuilt GPS to provide the location-based latitude and longitude of the site or geographical location coordinate having maximum network signal strength, or optimal signal strength. This data is provided to the user at the UI on the cloud dash board. The Mobile Application is able to display and track the measurements on a Map using GPS data. The GPS data can either come from the End Device IoT 120 or the Device housing the Mobile 105 Application itself. The preference would be to extract GPS & other directionality information from the Mobile Application itself unless otherwise directed to collect it from the End Device or IoT 120. The data may also come from the location detection module or the GPS module on the Cloud server 115.

In exemplary implementation, the invention is explained as series of step for two use case scenarios or Test Scenarios in N-View Mobile application. Both the use cases here are implemented on Smart phone.

1. Stationary mode and
2. Mobile mode.

N-View solution comes with the network detection dongle or the test kit 103 supporting IoT modules from all leading manufacturers like Quectel, SIMCOM & U-Blox etc. After deployment, N-View gives the user real-time visibility to ensure optimal sensor 120 performance. To start the test, the user connects the kit or dongle 103 to the mobile device 102 with N-View 105 app. N-View mobile app provides both stationary and mobile test capabilities.

Example 1: Stationary Mode

Figure 4:
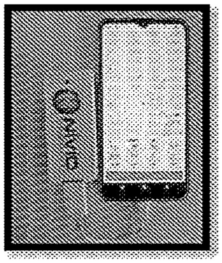
FIG. 4: Illustrates dongle connected to a mobile device via USB cable initiation of the mobile application 105 on establishing connectivity with the Network detection dongle 103 or test kit.
Figure 5:
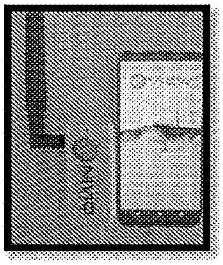
FIG. 5: Illustrates initiation of the mobile application 105 on establishing connectivity with the Network detection dongle 103 or test kit with antenna.
Figure 7:
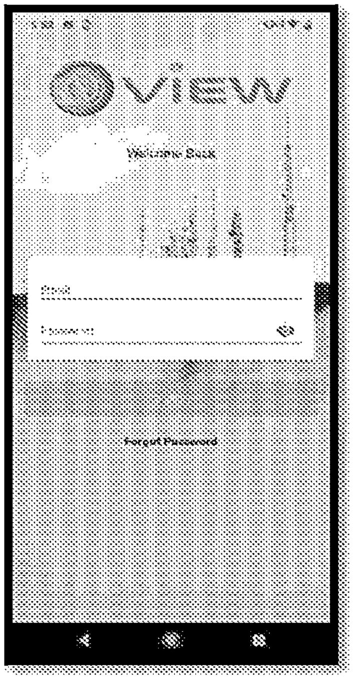
FIG. 7: Illustrates UI 102 for user login.
Figure 8:
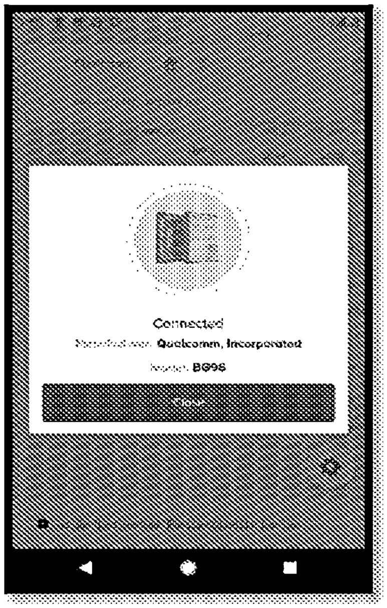
FIG. 8: Illustrates the dialog box appearing on the screen will show that the device is connected.
Figure 12:
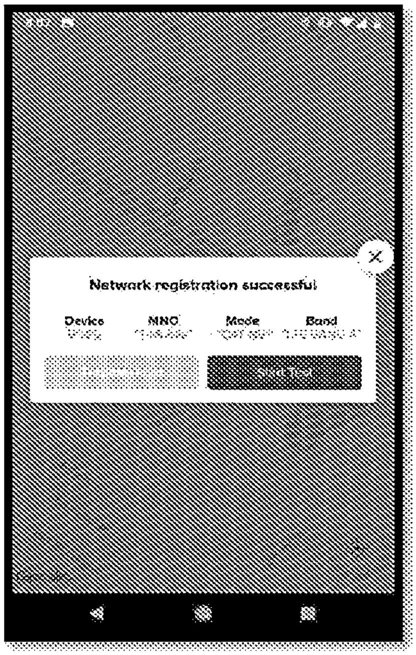
FIG. 12: Illustrates dialog box for successful registration.
Figure 13:
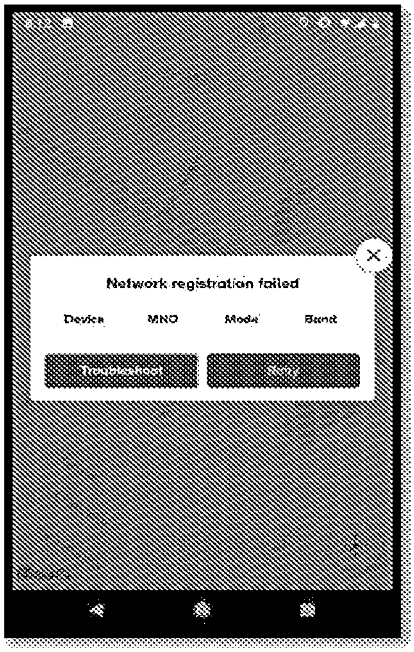
FIG. 13: Illustrates dialog box for unsuccessful registration.
Figure 14:
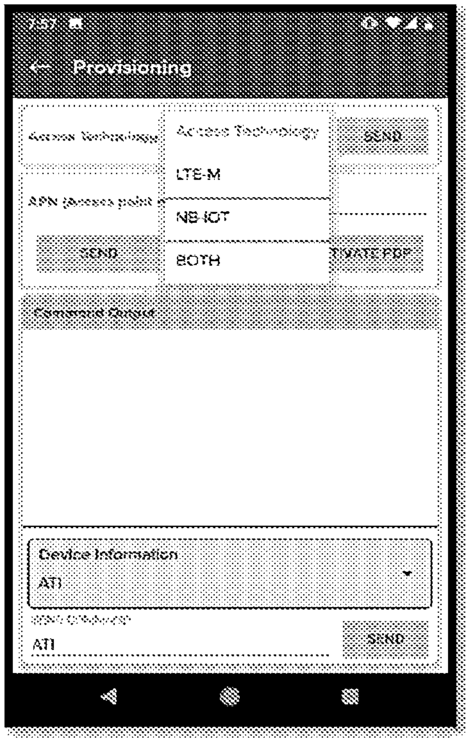
FIG. 14: Illustrates the provision window displaying information to troubleshoot the network establishment issue

1. Connect the N-View test kit with a mobile device (FIG. 4, 5).
2. Once connected, the N-View notification as illustrated in Figure will popup (FIG. 5). User can select OK to grant permission.
3. User authentication FIG. 7.
4. Open N-View, dialog box appearing on the screen will show that the device is connected, along with the manufacturer and device model information (FIG. 8). If the home screen shows that no device is connected, the application should be closed, disconnect the mobile device from the evaluation kit and run the setup again
5. Select Stationary mode (FIG. 9, 10, 11)
6. Network 110 registration window (FIG. 12, 13), FIG. 12 indicates successful registration and FIG. 13 unsuccessful registration. If the user selects the Troubleshoot option, the provision window (FIG. 14) will display with information to troubleshoot the network establishment issue. FIG. 15 illustrates the following information will be displayed: Device info, MNO information, Mode, Band, RSSI, RSRP, RSRQ and SINR on successful test completion (FIG. 15).
7. Test completion and results display as illustrated in (FIG. 16)
8. Optional or user customized parameters like Cell Tower location with corresponding eNB information for results validation can be enabled by user on selection of Layers option (FIG. 16).
9. On the test screen, user can select the arrow button to switch to the AT commands window (FIG. 16). Here, users can run the AT Commands from a pre-loaded list or manually enter an AT Command and view the respective results.
10. PING test: Illustrated in FIG. 17, Ping the remote server: The command is used to test the Internet protocol reachability of a host.

The stationary testing is focused on the network performance for the test site, hence validating the network coverage for the location and provides the detailed analysis of the network performance along with exact latitude/longitude value for the test site. This is implemented by any GPS inbuilt in the test kit or directly from the Cloud server.

Test Notes and test Site Images can be captured for the stationary Tests.

Operator related information like Mobile network operator (MNO), Mobile country code (MCC), Mobile Network Codes (MNC), band, eNB, sector ID etc. and all-important network operator information, network mode, Received Signal Strength Indicator (RSSI), Reference Signals Received Power (RSRP), Reference Signal Received Quality (RSRQ), Signal-to-interference-plus-noise ratio (SINR) and the like, can be captured. More detailed results can be viewed for the specific tests in the dashboard.

On the test result screen which is the cloud dash board 130 on the device 102, cell tower information showing the corresponding eNB values for validation can be viewed using Layers Option (FIG. 16).

In an exemplary implementation, the present invention in the stationary test mode, N-view application 105 has AT Command window, where user/engineer with the device 102 can command/configure the IoT module 142 on the dongle 103 to run tests for Network QoS and evaluate the results. AT Command Window Option eliminates the redundant work of disconnecting the Network modules and configure them separately, as all the configuration tasks can be performed in the AT Command Window.

For example, PING test

Ping the remote server: (FIG. 17) This command is used to test internet protocol reachability of a host 102. Users can either select and send the PING test command from the dropdown or select the command and edit it in the text box below the dropdown.

In another implementation (FIG. 5) users can run other AT Commands either by selecting from the given set of commands or manually entering any other supported AT command in the text box below the dropdown.

Selecting the End Test option on the test screen as shown in FIG. 6, the Complete Test dialog box will pop up. Selecting yes to confirm test. On completing the test, users will be taken to the Customer profile screen to save the test results to a particular Customer. On this screen users can select any Customer created from the Dashboard Display of Results on Dashboard.

Results display on the cloud dashboard 130 (FIG. 33), can view a brief version or a detailed version of a test conducted by a particular customer FIG. 34.

Figure 35:
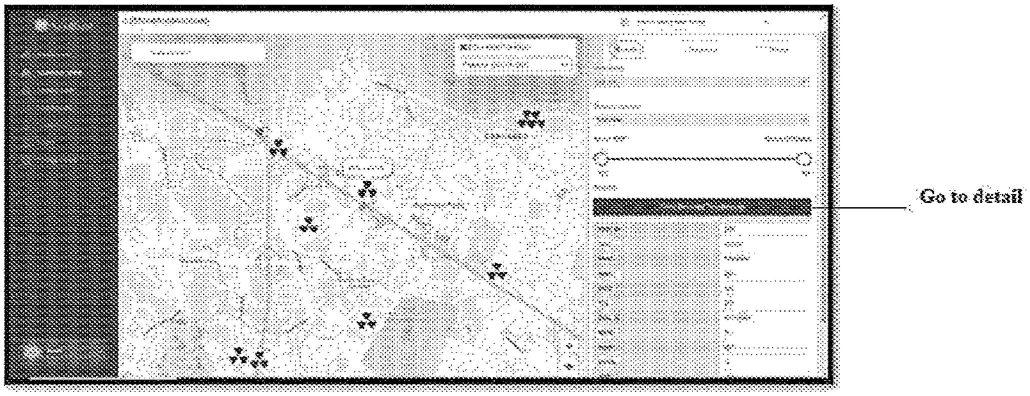
FIG. 35: Illustrates detailed version of a test conducted by a particular customer and user can analyses or evaluate test data based on test conducted, type of technology, network operator and the RSRP range

FIG. 34 illustrates a use case, wherein choosing the desired option from both dropdown menus, users will see all the tests conducted in a form of colored data points shown below. Users can select each data point to view the summary of results on the right side of the screen. Users can select the "Goto Detailed Test Results" tab to view the detailed results of that test. Users can filter the results on the right side of the screen using the four filters provided. Users can filter on the basis of type of test conducted, type of technology, network operator and the RSRP range (FIG. 35).

Figure 36:
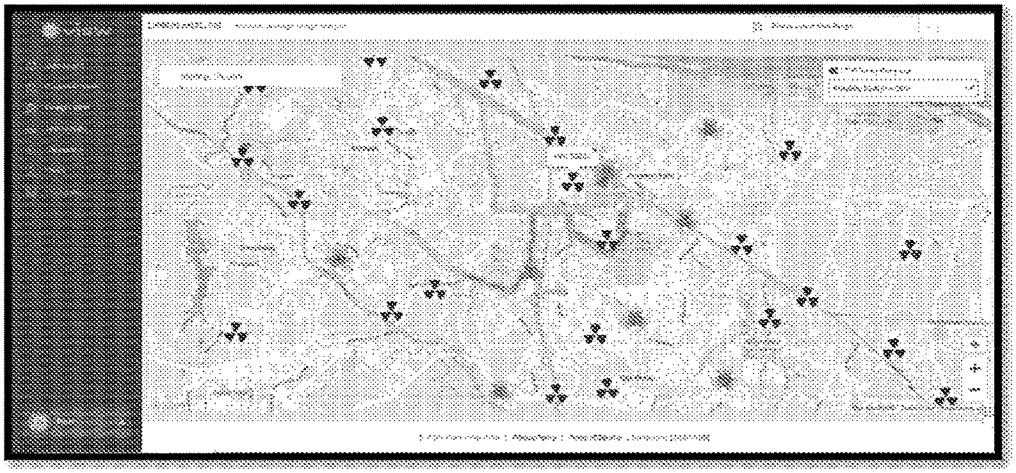
FIG. 36: Illustrates Design view displaying the heat map of all tests conducted in the selected area which are displayed based on user selection of the network operator

In another implementation as illustrated in FIG. 36, i.e. the Design View in the dash board, users can select the location from the bar located on the left side of the screen as indicated below and choose the network operator from the dropdown menu on the right side of the screen to see the heat map of all tests conducted in the selected area.

Test Results on Dashboard

Figure 37:
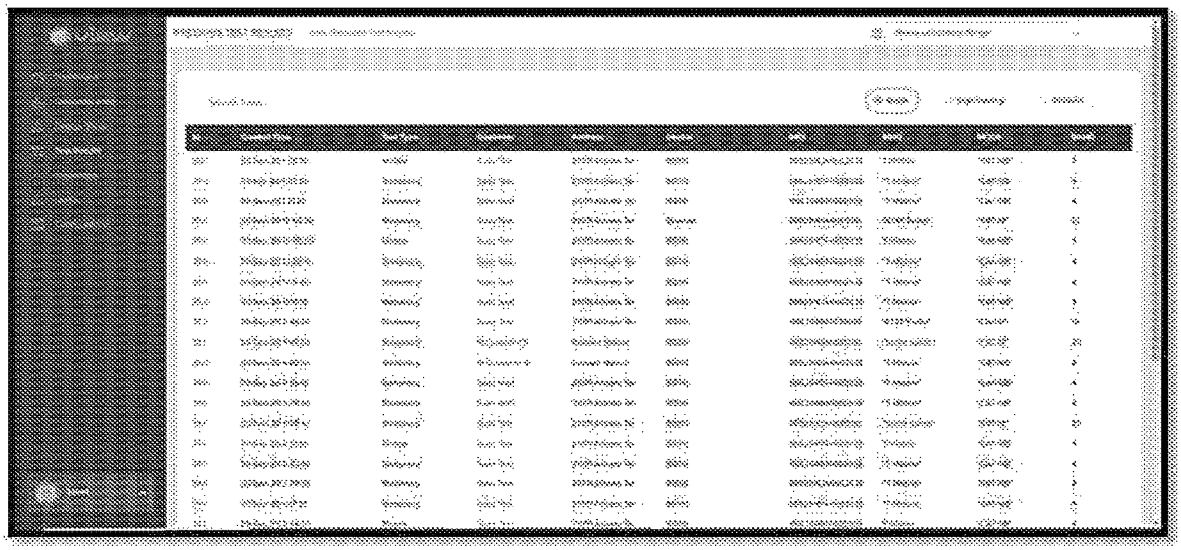
FIG. 37: Illustrates test results option, users can find the log of all the performed and saved mobile tests and stationary tests
Figure 38:
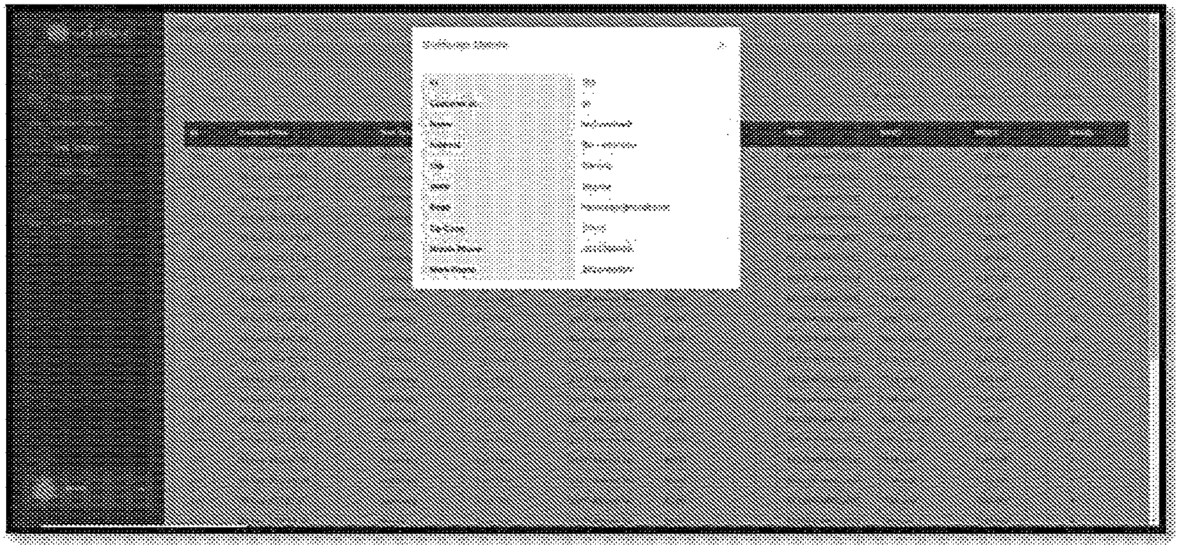
FIG. 38: Illustrates test results option where users can select the respective customer name. Cell tower coverage can be viewed around the test location by selecting the toggle button "Cell Tower Coverage".
Figure 39:
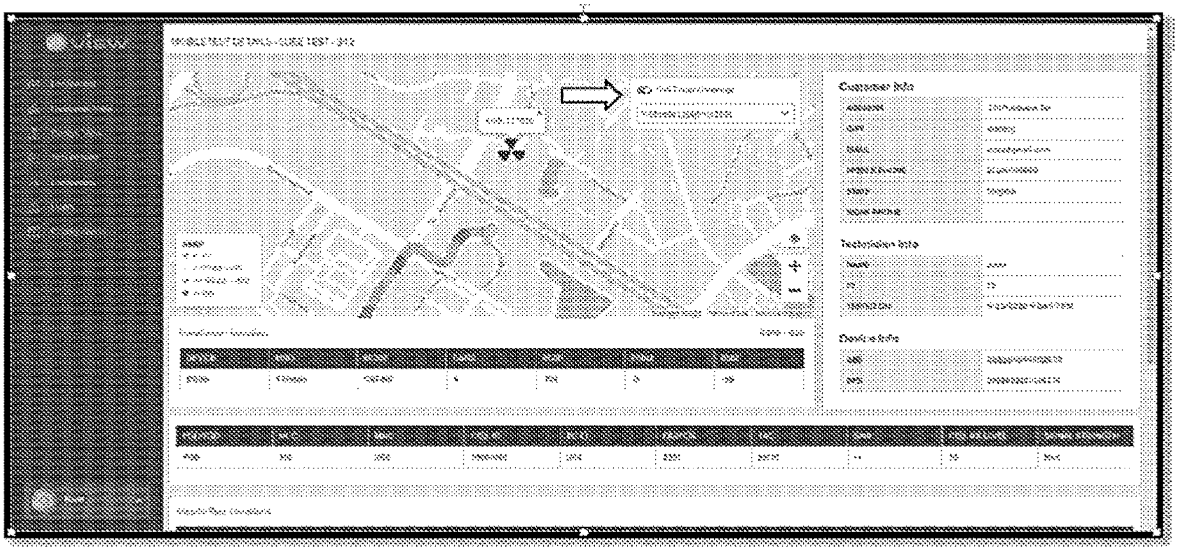
FIG. 39: Illustrates in Mobile test mode Cell tower coverage view around the test location by user selection of "Cell Tower Coverage". Cell towers for a particular operator for whom the test was conducted can be seen on the screen as shown below.
Figure 40:
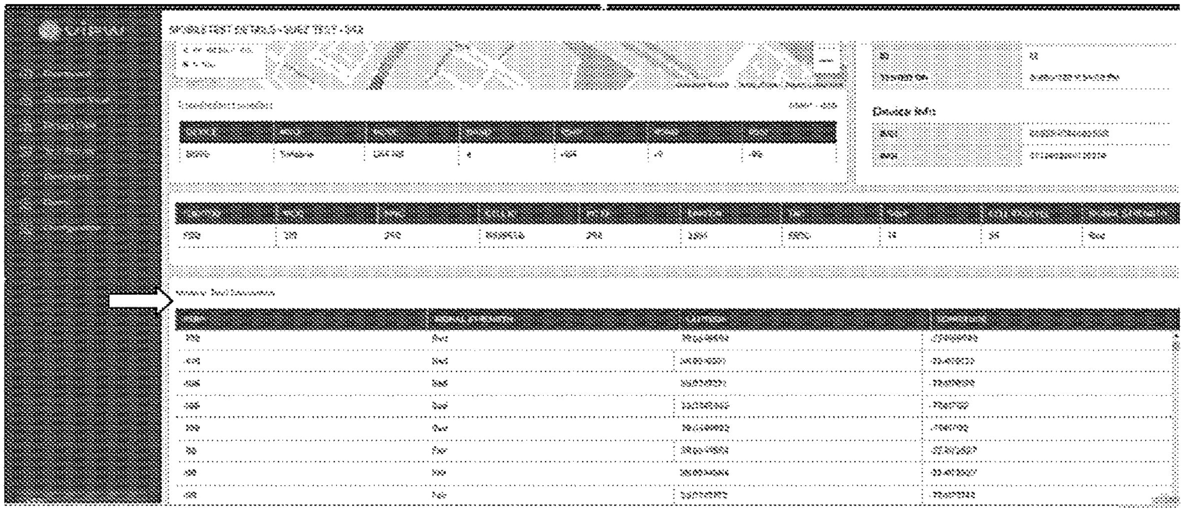
FIG. 40: Illustrates longitude, latitude and signal strength for all captured data points in the dashboard.

Under the test results option FIG. 37, users can find the log of all the performed and saved mobile tests and stationary tests with their respective information in the form of a list. Users can search for a specific test in the search bar located on the top of the screen or can filter them with options provided as shown below. This option provides the list of all the tests performed and saved using N-View mobile application. User may click and view detailed analysis for any of the listed tests. Data like network parameters, operator information, survey results, test site images and Latitude/Longitude values for each data point can be viewed in detail (FIG. 40).

Figure 41:
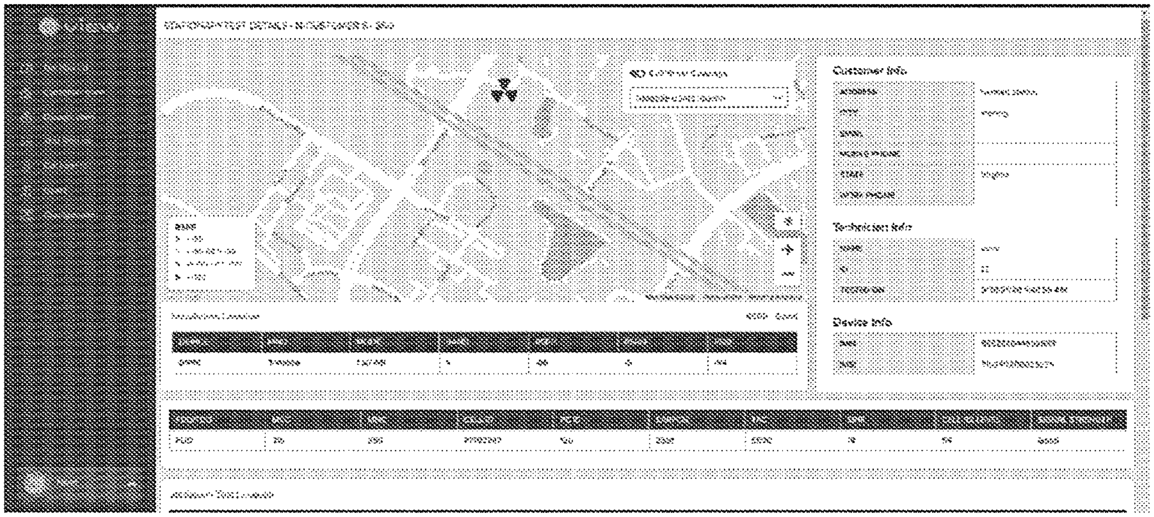
FIG. 41: Illustrates the dashboard displaying Stationary Tests, where users can select the respective ID of any customer to view the detailed analysis of the test on the screen.

For Stationary Tests, users can select the respective ID of any customer to view the detailed analysis of the test on the screen. FIG. 41.

Test Log: All the AT commands executed on the application while conducting the test can be viewed under Test Log.

N-View or Mobile Application Platform 105 Display on Dashboard 130

Figure 43:
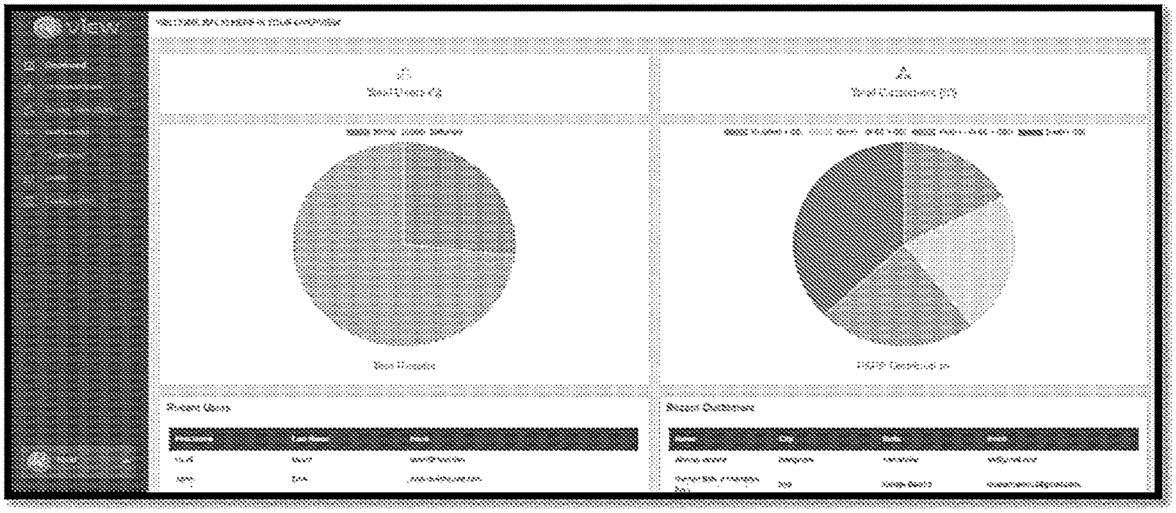
FIG. 43: Illustrates N-View Dashboard for Customer view.
Figure 44:
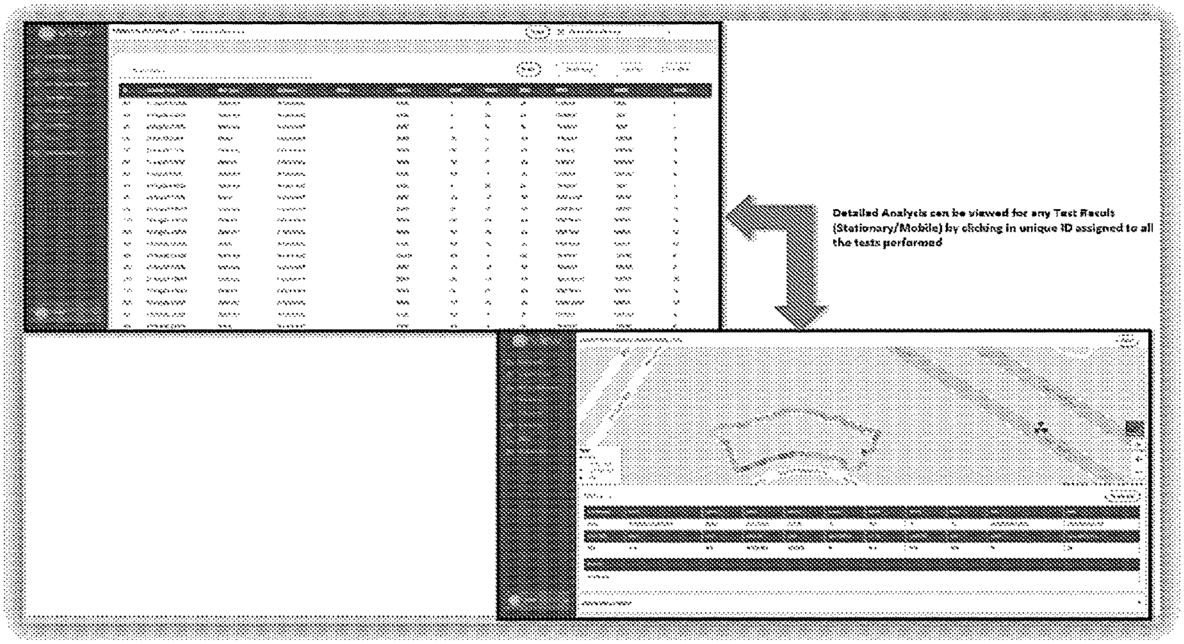
FIG. 44: Illustrates N-View Dashboard for list of all the tests performed and saved using N-View mobile application.
Figure 45:
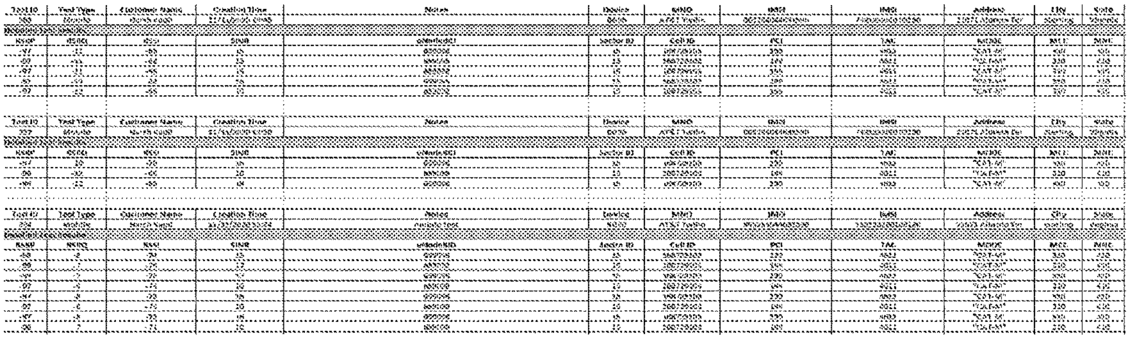
FIG. 45: Illustrates exported the test results into an excel format.
Figure 46:
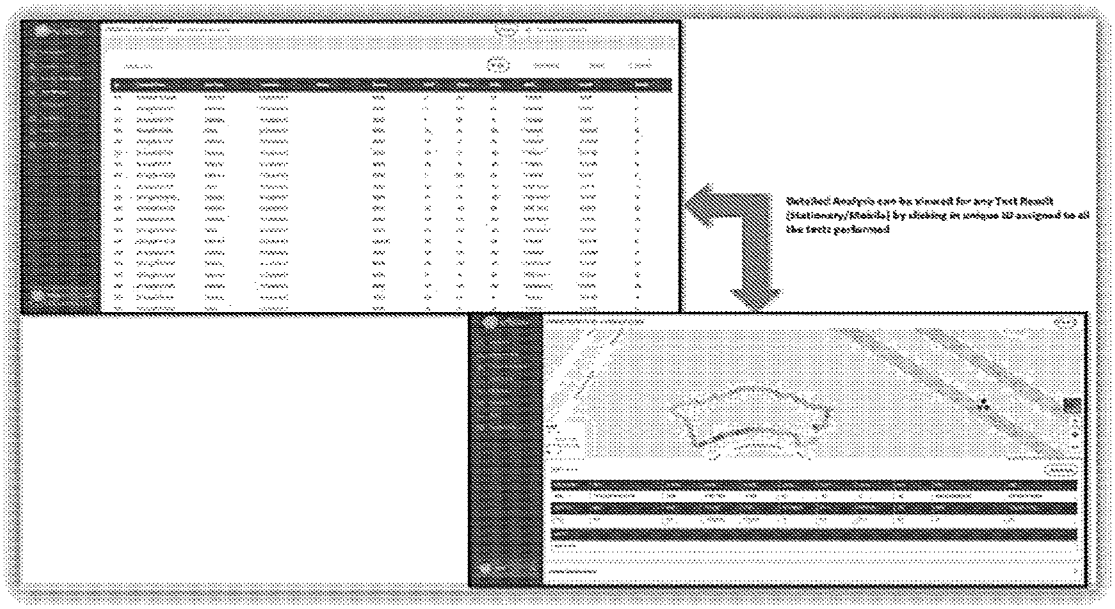
FIG. 46: Illustrates user view of a brief or detailed version of a test conducted for a particular customer.
Figure 47:
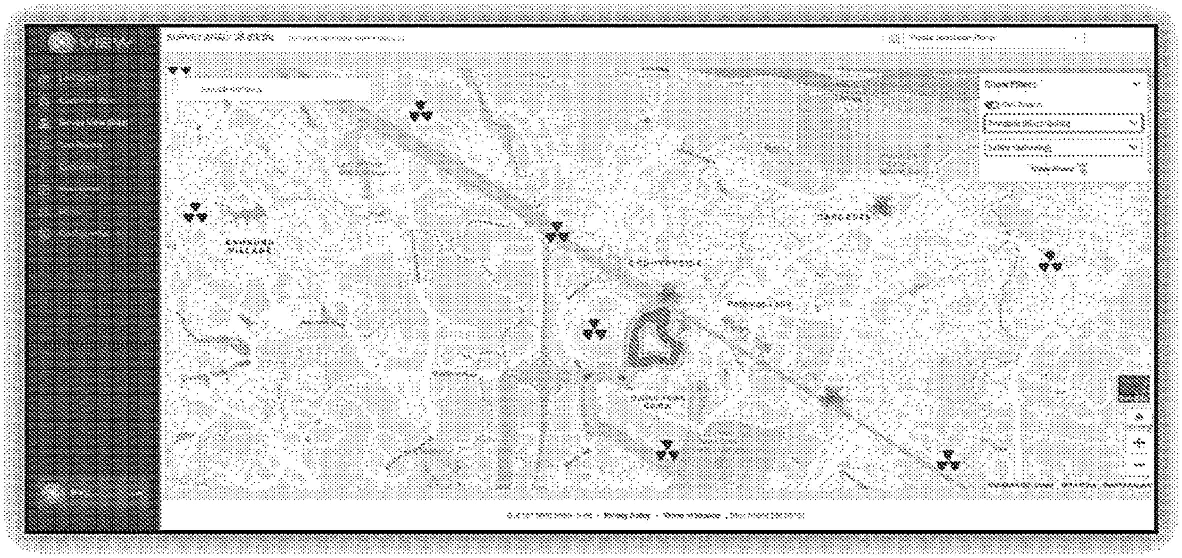
FIG. 47: Illustrates Survey View (Beta) showing heat map analysis for the tests performed
Figure 48:
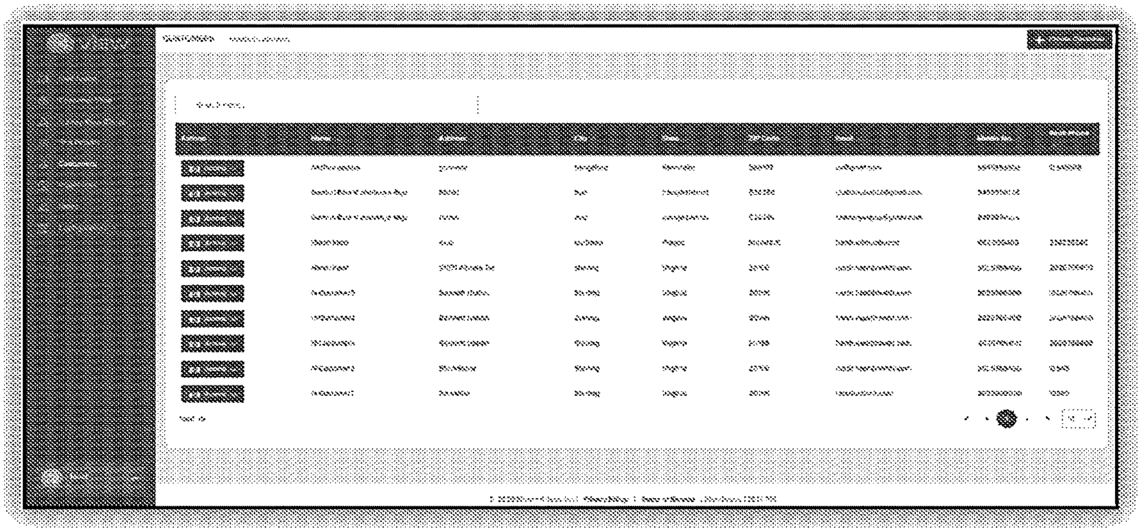
FIG. 48: Illustrates Admin view, displaying an option to perform various actions to create customer profiles and manage the list of the customers added.
Figure 49:
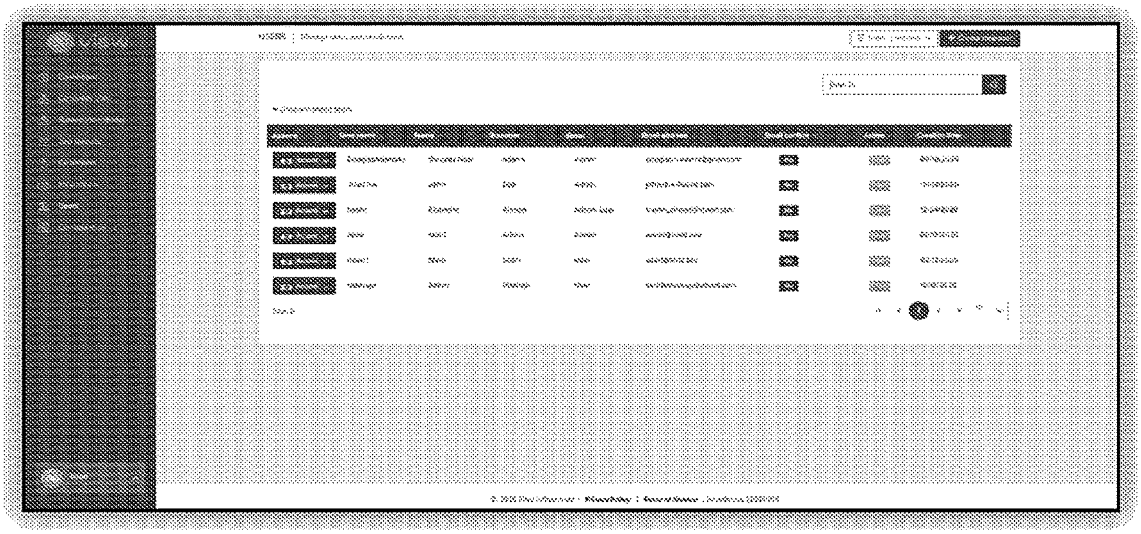
FIG. 49: Illustrates User view to manage the list of the users added and tasks that they can perform.

1. N-View platform validates RF design and network KPIs using cloud-based analytics dashboard. Dashboard provides the capability to view and analyze the captured data for all the customers with various options like Customer view, Survey view and Test results. Tasks like creating and managing customer/user profiles can be performed over the dashboard. All recent updates and activities, which provides an overview of recently saved tests, recent users who have logged in and recent customers who have used the application can also be viewed on the Dashboard homepage (FIG. 45). User gets the option to export the test results into an excel format (FIG. 47).
2. Customer view on dashboard: (FIG. 43) Using this option on the dashboard, the user can view a brief or detailed version of a test conducted for a particular customer.
   - Users can select the customer and the operator for which the results need to be viewed using the dropdown menus provided. It provides users with clustered view of all the tests being performed in a specific region. Hence, the user can filter down to any specific test performed in a required location and view the detailed analysis of a specific test for selected customer.
   - Test results can be filtered based on Technology, RSRP range and test type from both dropdown menus.
   - Each data point can be selected individually to view the summary of results.
3. Survey View (Beta) (FIG. 47): This option provides the heat-map analysis for the tests performed. This feature is under development.
4. Customer: (FIG. 48, 49) this feature provides admin, an option to perform various actions to create customer profiles and manage the list of the customers added. Also, admin is given option to define the set of permissions for all profiles accordingly. Under the Customers option on the sidebar, the user can view the name and corresponding information of all the customers. Users can create new customers by selecting the "Create new customer" button on the top right corner of the screen and then providing further details. Customers can be searched by their name in the search bar for quick results (FIG. 50).
5. Users: The user's option in the sidebar provides the admin option to perform various actions in order to manage the list of the users added and tasks that they can perform. Admins can add new users by selecting the "Create new user" button on extreme right corner of the screen. An Excel file of the list of users can also be exported from the dashboard 45. Various actions like editing profile information, deleting a user and setting permissions can be performed by choosing the required option from the Actions drop down menu (FIG. 49).
6. Configurations:

Configuration options provide users with four sub options that are Roles, Audit Logs, Subscription and Web hook Subscriptions.

Figure 50:
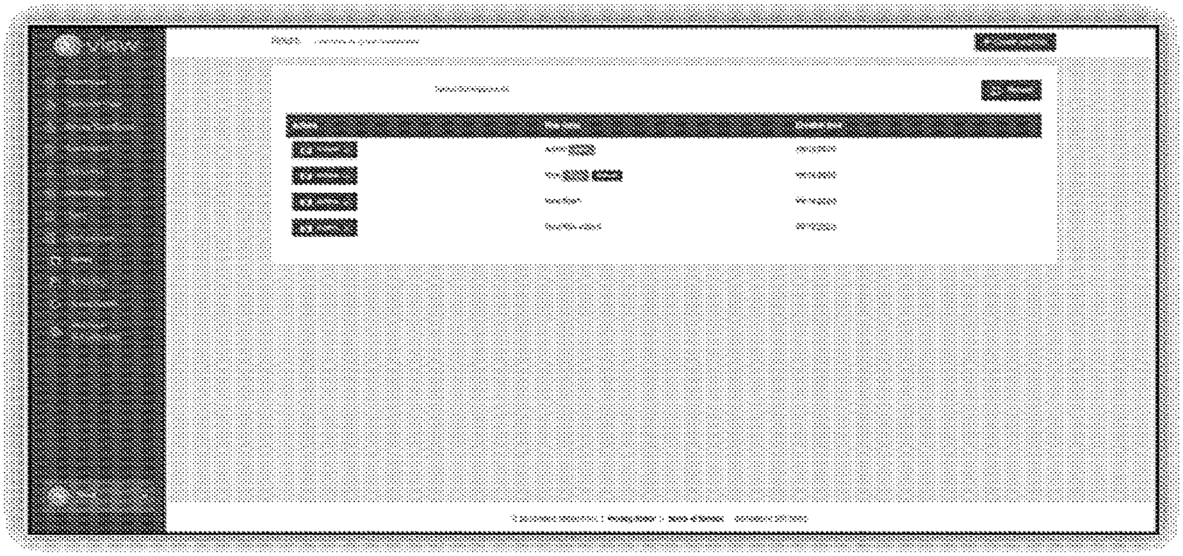
FIG. 50: Illustrates Configuration options provide users with four sub options that are Roles, Audit Logs, Subscription and Web hook Subscriptions.

Roles: (FIG. 50)

- Using this option on the dashboard, admins can add new roles by selecting the "Create new role" button on the top right corner of the screen. Users can also perform some actions for a specific role in the list as shown below.
- The drop-down menu of Actions in front of the role gives an option to edit the role and set permissions.
- Users can also set customized permissions to each created role. Based on the roles and responsibilities, permissions can be edited and updated. Permissions to be given to a specific role can be selected by checking the boxes as shown below.

Audit Logs:

Under this option, the user can view all the existing Operation logs. The list of this log can be exported to an Excel sheet by selecting the Export to excel button on the top right corner on the screen. Users can select the magnifying glass icon on the left side to view more information about log details of a particular user.

Example 2: Mobile Mode

In another exemplary embodiment the Mobile Test (FIGS. 20-25) is conducted for checking network performance, locating "No service" areas and determining coverage criteria with N-View test kit and application. The data collected by performing mobile test is logged and saved to the specific customer profiles, hence can be analyzed to evaluate various RF parameters of the network.

N-View mobile test provides the detailed analysis of the network performance along with exact latitude/longitude value for all the data points captured.

Just like stationary tests, operator related information like MNO, MCC, MNC, band, eNB, sector ID etc. and all-important RF parameters like RSSI, RSRP, RSRQ & SINR etc. can be captured. Each data point can be viewed individually to view the corresponding captured data.

Mobile test option provides real time visibility and data analysis capability thus, helping users to identify an optimum location for IoT module or sensor 120 installation.

Figure 9:
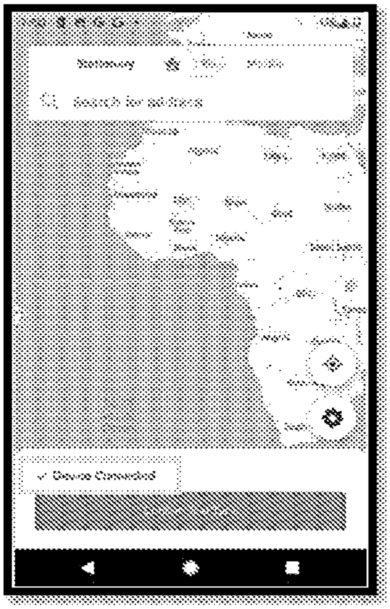
FIG. 9: Illustrates the device connectivity.
Figure 10:
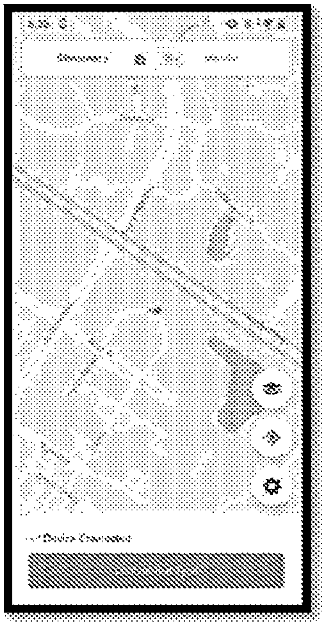
FIG. 10: Illustrates the Home screen for the option Stationary Test type.
Figure 22:
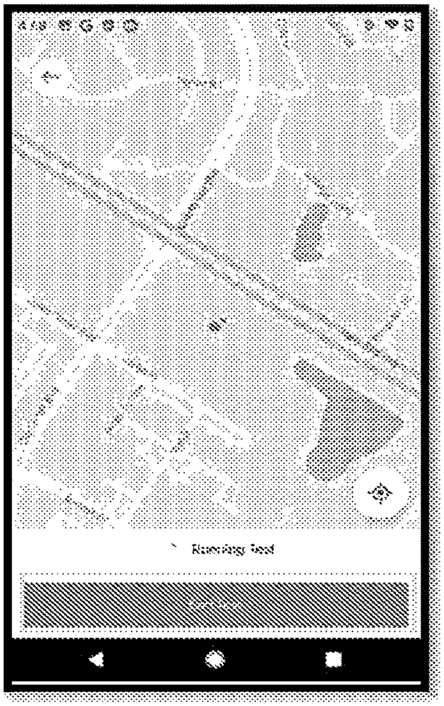
FIG. 22: Illustrates the user screen displaying a blue icon in the direction of the user.
Figure 23:
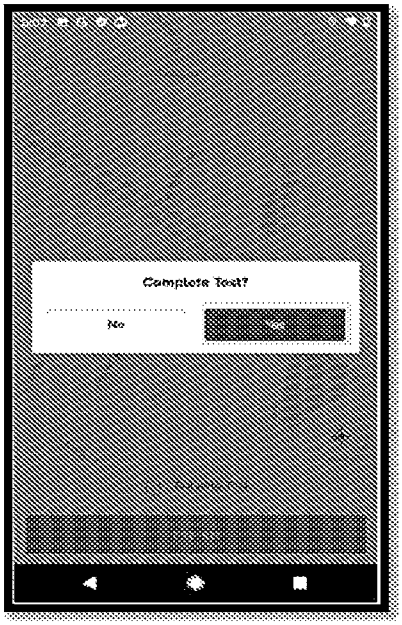
FIG. 23: Illustrates the successful completion of the test and display End Test as dialog box to confirm test completion.
Figure 24:
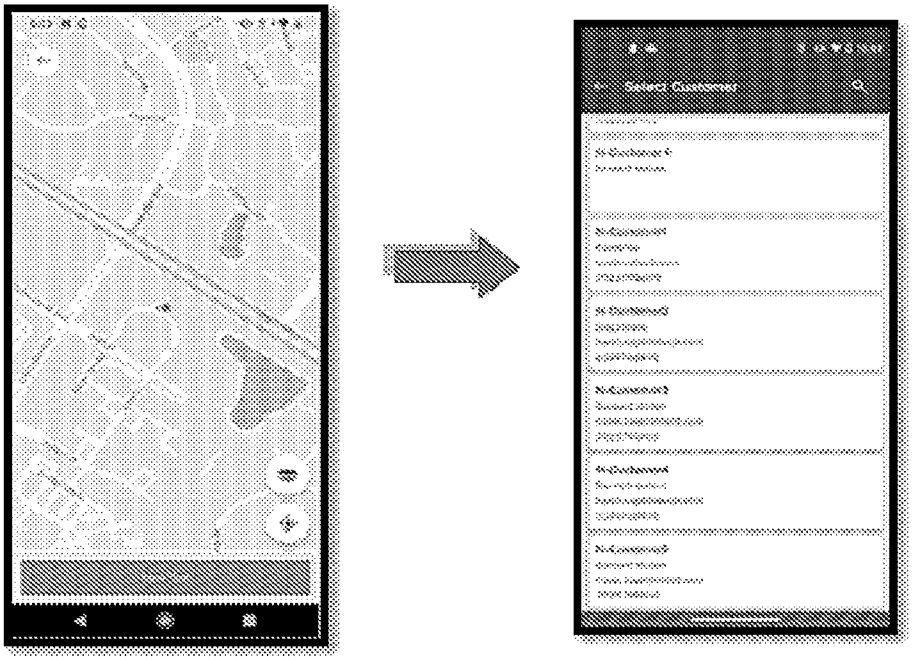
FIG. 24: Illustrates Save Test option as displayed to select the Customer profile screen and also selection of any customer created from the Dashboard (130).
Figure 25:
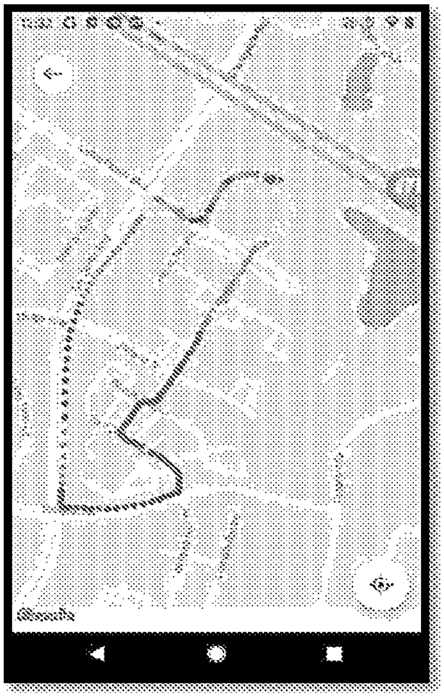
FIG. 25: Illustrates the test path using the system of the present invention displaying results of the test in the form of different color plots along the same path followed by the user while performing the test.
Figure 28:
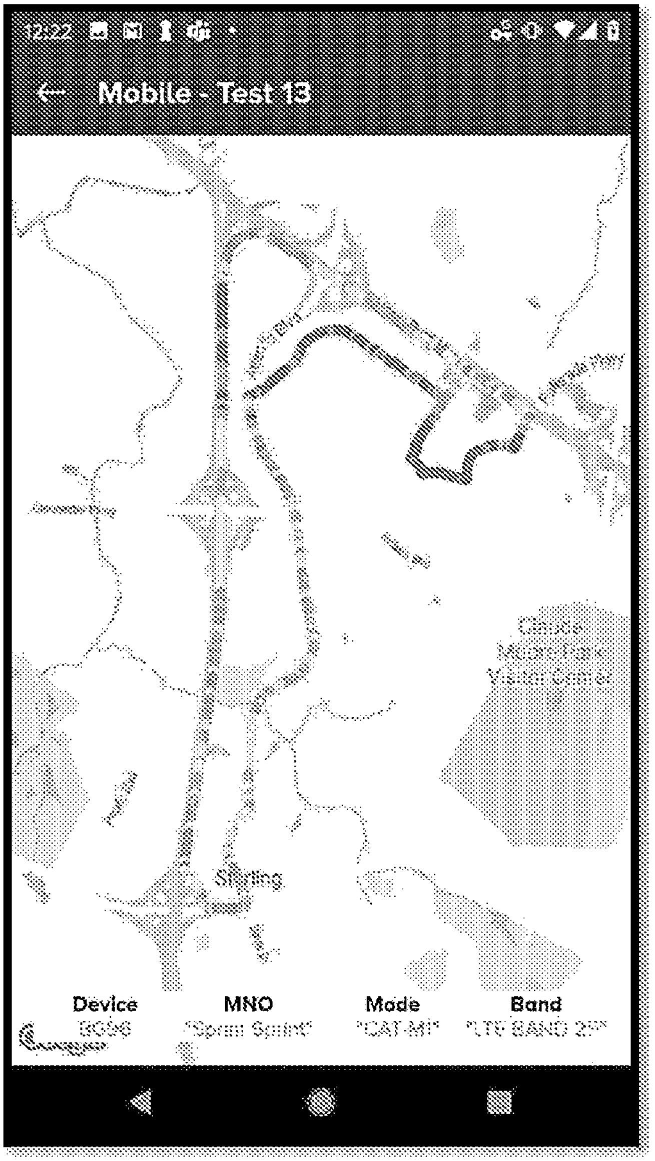
FIG. 28: Illustrates Mobile Test Results which user can select any of the collected data points to view the RSRP values at a particular location, displayed on bottom of the screen is MNO, Mode and Band information. Exemplary embodiment shows a test run 13.

1. Connect the N-View test kit or data detection dongle 103 with a mobile device 102.
2. Once connected, the N-View notification as illustrated in FIGS. 4, 5, and 6) will popup. User can select OK to grant permission.
3. User authentication as illustrated in FIG. 7
4. Open N-View, dialog box appearing on the screen will show that the device is connected (FIG. 8), along with the manufacturer and device model information (FIG. 9). If the home screen shows that no device is connected, the application should be closed, the mobile device disconnected from the evaluation kit 103 and run the setup again.
5. Selection of Mobile mode (FIG. 20)
6. Network 110 registration window 21, FIG. 22 illustrates successful Network 110 registration.
7. Blue icon in FIG. 24 illustrates the direction of the user in the N-view application 105 dashboard 130.
8. Test completion and results display as illustrated in FIG. 28
9. On completing the test, the Save Test option will display. Select the Customer profile screen. On this screen users can select any Customer created from the Dashboard (FIG. 28).

The user will be able to see results of the test in the form of different color plots along the same
path followed by the user while performing the test.
Each colored plot represents the recorded RSRP value at the respective location FIG. 25.

Figure 26:
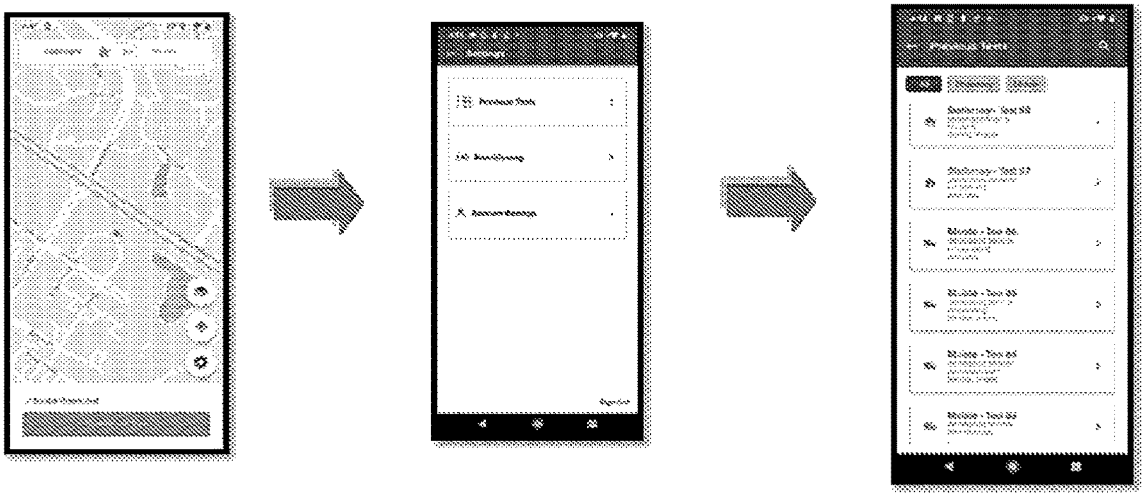
FIG. 26: Illustrates selection of the Settings icon ⚙ at the bottom of the main screen to view the test logs.
Figure 27:
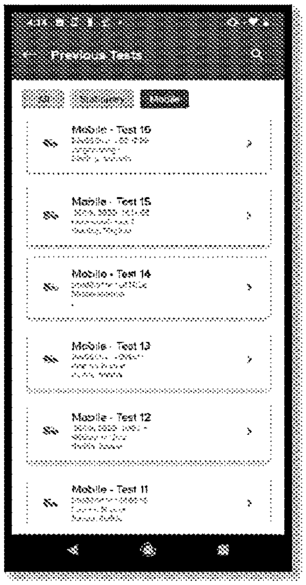
FIG. 27: Illustrates customer selection of the required Mobile test results to view the respective logs.
Figure 29:
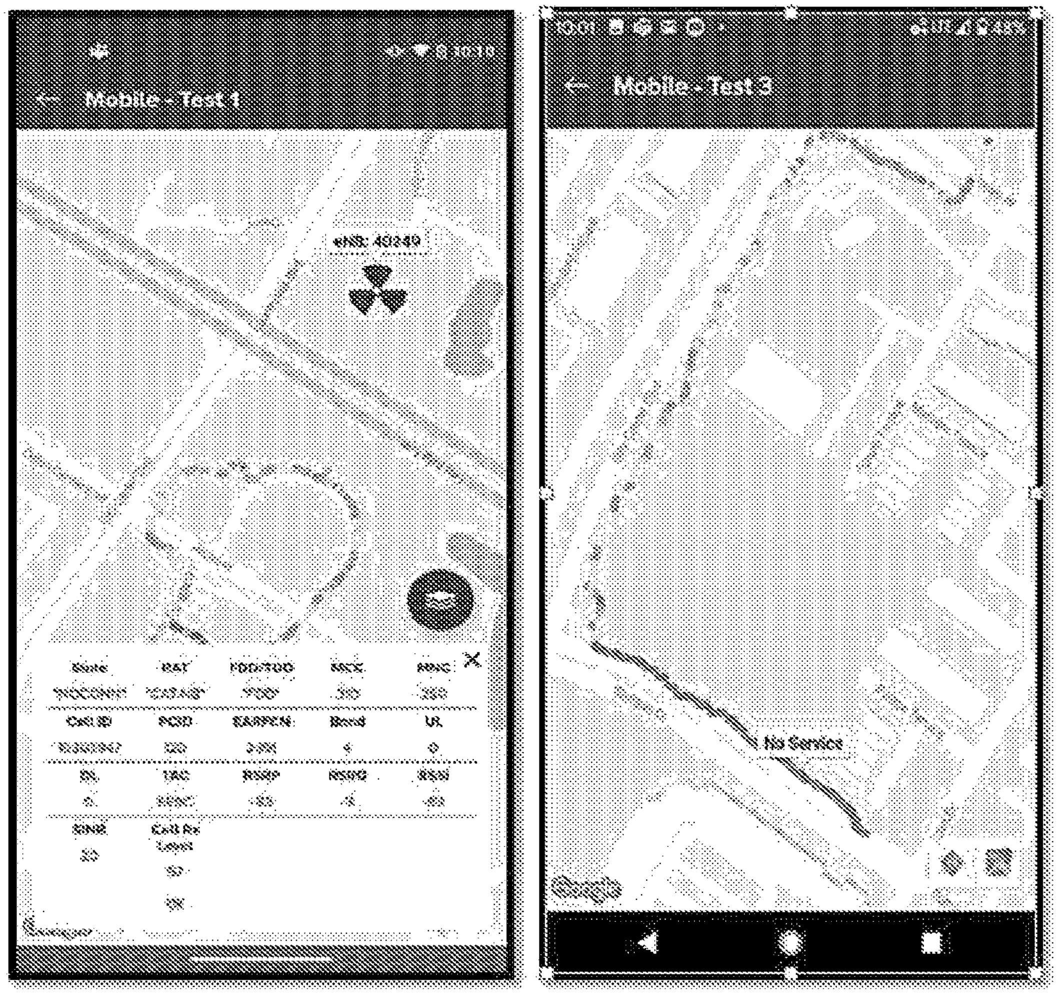
FIG. 29: Illustrates exemplary selection by the user any of the data point/plot to view information like Cell ID, PCID, RSRP, RSRQ, and SINK. Exemplary embodiments show that grey indication as "No Service", User may also select layers option displayed for nearby cell tower information.

10. Illustrated in FIG. 26, is selection of the Settings icon ⚙ at the bottom of the main screen to view the test logs. The Settings screen contains the Previous Tests option where users can view the log of all previously performed tests.
11. Illustrated in FIG. 27, Selection of the required Mobile test results to view the respective logs. The Layers option is available for the previous test logs to view the Cell tower info with corresponding cell ID information.
12. Mobile Test Results: Illustrated in FIG. 28, the user 102 can select any of the collected data points to view the RSRP values at a particular location. On the bottom of the screen, the user can see the MNO, Mode and Band information.
13. Illustrated FIG. 29, Selection of any of the data point/plot to view information like Cell ID, PCID, RSRP, RSRQ, SINR, etc. The screenshot is shown below for your reference. Also, any network issues discovered will be shown with grey dots representing "No Service". To view the nearby Cell Tower location with corresponding Cell ID information for results validation, select the Layers option.

Figure 20:
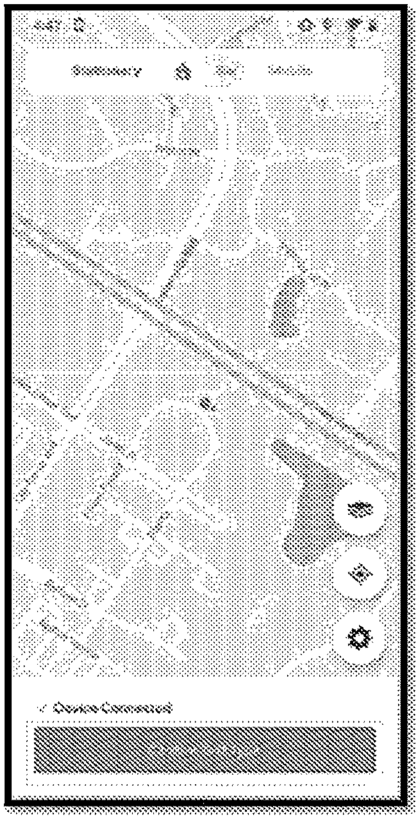
FIG. 20: Illustrates Selection of the Mobile Test mode (User is prompted to select confirm test type to start the mobile testing)
Figure 21:
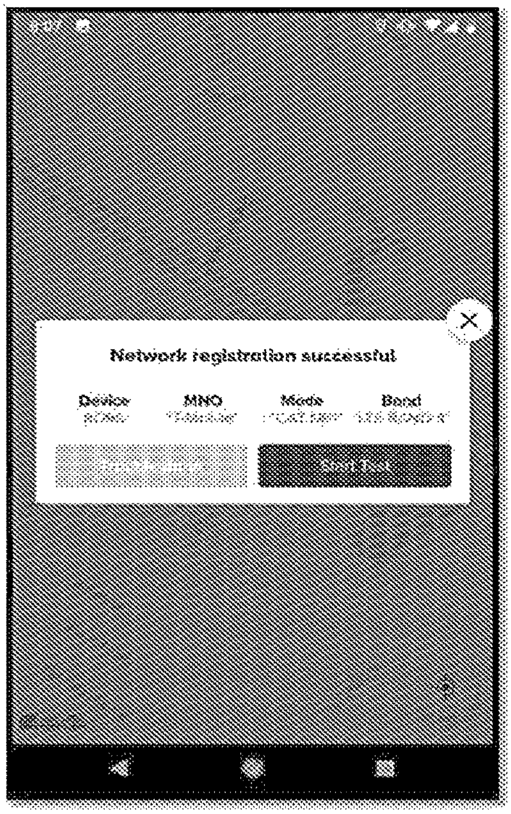
FIG. 21: Illustrates successful network registration of the N-View application.
Figure 42:
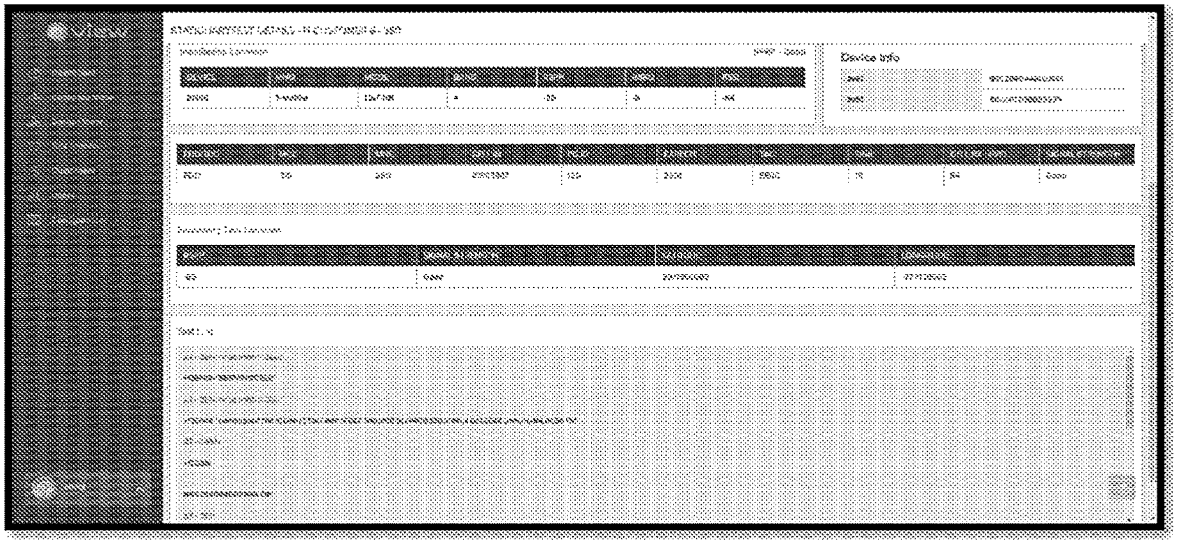
FIG. 42: Illustrates All the AT commands executed on the application while conducting the test can be viewed under Test Log.

Test Results
Customer Relevant Data
Illustrated in FIG. 20, 23, 30, for Mobile Test use case, users can select the respective ID of any customer to view the detailed analysis of the test on the screen. System is configured such that users can further view all the important details related to the captured data points by selecting them. Cell tower coverage can be viewed around the test location by selecting the toggle button "Cell Tower Coverage". Cell towers for a particular operator for whom the test was conducted can be seen on the screen as shown below.
GPS or GIS data: Illustrated in FIG. 42
When the user scrolls down on the test details window, details like longitude, latitude and signal strength for all captured data points can be viewed as shown below.

Advantages of the Present Invention

Determine with accuracy optimal locations to deploy IoT sensors based on network coverage intelligence.
Reduce truck rolls and the associated cost of deployment.
Validates RF design and network KPIs using cloud-based analytics dashboard.
A low-cost solution to improve sensor deployment efficiencies.

To keep track of how the IoT use-case has been deployed, and to ensure optimal performance over time, the long need to visibility into empirical network data has been addressed by the system and method of the present invention. N-View provides data-driven network insights and intelligence to ensure IoT deployment performs efficiently.
Enables to accurately measure how robust the network coverage is at a given location.
N-View provides a number of connectivity parameters that enables you to determine with a high degree of confidence the most optimal locations to deploy the IoT sensors. Post-deployment, the user can use N-View analytics to track and validate network performance in the context of the initial SLAs. This minimizes the need to dispatch technicians for troubleshooting, and ensures desired level of service always resulting in superior customer experience and loyalty.
Reduce remediation challenges
The cost and inefficiencies to remediate problems due to poor connectivity could be substantial. For example, when a thousand connected parking meters are deployed in a city block, and 20% of the locations have poor connectivity, the number of truck rolls and associated cost is significant. N-View is a low-cost solution to eliminate such inefficiencies. Using N-View one can measure and determine locations with reliable IoT connectivity before you deploy the sensors.
Accelerate sales cycle
The ability to test and assess optimal connectivity in advance enables you to:
1. Reduce the time needed to deploy IoT sensors
2. Reduce the number of truck rolls
3. Provide a high degree of confidence in your deployment and runtime performance
4. Improve customer experience and reduce churn rate
N-View is designed to accelerate sales by simplifying your IoT deployment process.
Boost operational efficiency
Certain wireless protocols support multiple frequency bands for uplink and downlink. With N-View you can decide sensor locations with best connectivity guarantee and control traffic spread across your frequency bands with improved granularity.
N-View's network health data can validate your network and design assumptions based on statistical models. N-View's analytics platform gives you the visibility to compare different markets and their performance to monitor current operations and to plan for the future.

We claim:
1. A system for identification/detection, selection and validation of wireless network for IoT devices, comprising:
an application programming interface (API)/mobile platform 105 at a user interface (UI) on a computer implementable device 102 at the user end;
hardware kit/dongle or Network detection dongle 103;
communication network 110;
a server 115;
one or more network modules of network operators/vendors; and
one or more IoT sensors or devices to be deployed or installed 120,
wherein the system is configured to detect/determine an optimum location for Internet of Things (IoT) sensor installation,
wherein the API 105 is configured to run a network detection software on the server 115 when connected to the communication network 110 to provide real-time network intelligence insights, and wherein the API 105 is installed on one or more computer implementable devices 102, when connected to the Network detection dongle 103 is configured to initiate the API, detect the signal strength of one or more connectivity technologies real time or near real time from one or more network modules of network operators/vendors 127, via the application programme interface 105 or a thin client within the module and then transferred to the server 115, to determine and validate an optimal location for IoT sensor/device installation or deployment based on the highest signal strength.

2. The system for identification/detection, selection and validation of wireless network for IoT devices as claimed in claim 1, wherein the server 115 comprises of Cloud server.

3. The system for identification/detection, selection and validation of wireless network for IoT devices as claimed in claim 1, wherein the server 115 further comprises of Geographic Information System (GIS).

4. The system for identification/detection, selection and validation of wireless network for IoT devices as claimed in claim 2, wherein the server 115 further comprises data science layer communicating through the cloud network 110 to provide real time data insight of one or more connectivity technologies.

5. The system for identification/detection, selection and validation of wireless network for IoT devices as claimed in claim 4, wherein one or more connectivity technologies comprises Narrowband IoT (NB-IoT), Long term Evolution for Machines (LTE-M), 5G, Long Range (LoRa), Sigfox and Wi-Fi.

6. The system for identification/detection, selection and validation of wireless network for IoT devices as claimed in claim 4, wherein the data insight comprises signal strength of the connectivity technology.

7. The system for identification/detection, selection and validation of wireless network for IoT devices as claimed in claim 6, wherein the data insight further comprises of location data with precise location coordinates providing highest network signal strength of one or more network operators 127.

8. The system for identification/detection, selection and validation of wireless network for IoT devices as claimed in claim 2, wherein the server 115 further comprises of an analytics engine 111 to determine the IoT signal performance real-time or near real time to the cloud server 115 and the data from the sensor network module is sent in near real-time to the backend server and the backend server performs the data processing and modelling to provide analytics that will be displayed on the frontend dashboard 130.

9. The system for identification/detection, selection and validation of wireless network for IoT devices as claimed in claim 8, wherein the analytics engine 111 is configured to process the real-time data of the IoT sensor performance and communicates to the server 115 for storage and the API 105 is configured to extract and display the IoT sensor data at user interface on a cloud dash board 130.

10. The system for identification/detection, selection and validation of wireless network for IoT devices as claimed in claim 1, wherein the system further comprises of a display module 114 configured to display the analytics data real-time at the user interface at the cloud dashboard 130.

11. The system for identification/detection, selection and validation of wireless network for IoT devices as claimed in claim 1, wherein the optimal location is determined either by a inbuilt GPS in the network module of the dongle 103, or acquired from the location detection module on the cloud server 115 in communication with network 110 configured to detect signal strength at predefined locations.

12. The system for identification/detection, selection and validation of wireless network for IoT devices as claimed in claim 1, wherein the computer implementable device comprises of one or more of laptop, mobile, smart devices or any other device.

13. The system for identification/detection, selection and validation of wireless network for IoT devices as claimed in claim 1, wherein the Network detection dongle 103 further comprises of a network module 142 with a Subscriber Identity Module (SIM) slot and serial connectivity, a conversion board with a Universal Serial Bus (USB) or Controller 141 and a Long Term Evolution (LTE)/Global Positioning Satellite (GPS)/Global Navigation Satellite System (GNSS) Printed Circuit Board (PCB) antenna 134 and embedded SIM (eSIM) 140, and when the Network detection dongle 103 is connected to initiate the API 105 installed on computer implementable device 102, detects the signal strength of one or more connectivity technologies 125 in real time or near real time from one or more network modules of network operators/vendors 127, to determine and validate an optimal location for IoT device module 120 installation or deployment based on the highest signal strength.

14. The system for identification/detection, selection and validation of wireless network for IoT devices as claimed in claim 13, wherein the eSIM 140 configurations are enabled on the provisioning window of the cloud dashboard 130, and wherein the eSIM 140 is configured to switch between one or more connectivity technologies based on network signal strength.

15. The system for identification/detection, selection and validation of wireless network for IoT devices as claimed in claim 13, wherein the network module 142 comprises Mini Peripheral Component Interconnect Express (PCI-E)- or Gigabit Network Card (M2)-based network module inserted or latched on the board 141 and connected via USB or Bluetooth to the application 105 on the device 102.

16. The system for identification/detection, selection and validation of wireless network for IoT devices as claimed in claim 13, wherein the conversion board 141 comprises Mini Peripheral Component Interconnect Express (PCI-E) to USB (SIM Slot) adapter.

17. The system for identification/detection, selection and validation of wireless network for IoT devices as claimed in claim 1, wherein the system provides on-site network coverage measurements real-time or near real-time from the IoT device module 120.

18. The system for identification/detection, selection and validation of wireless network for IoT devices as claimed in claim 1, wherein the API 105 is configured to command the IoT sensor module to run tests for Network Quality of Service (QoS) and evaluates the results.

19. The system for identification/detection, selection and validation of wireless network for IoT devices as claimed in claim 1, wherein the system is configured to provide network insights in both stationary and mobile mode.

20. The system for identification/detection, selection and validation of wireless network for IoT devices as claimed in claim 1, wherein the system is configured to validate Radio Frequency (RF) design and network key performance indicators (KPIs) using cloud-based analytics dashboard.

21. A method of identification/detection, selection and validation of wireless network for IoT devices, comprising steps:

connecting of the communication dongle or hardware kit/dongle or Network access detection dongle to a computer implementable device at the user end;

authentication of the user at the user interface (UI) of the device;

user selection of the location navigator;

wherein the API is configured to navigate the location in stationary mode or mobile mode, establishing device connectivity with a communication network;

extraction of IoT sensor/device data real-time from one or more IoT modules 120 and communicating to the server 115 on the network 110;

processing of the IoT module data real time or near real time by the processor in the server;

display of the network connectivity and device data real-time or near-real time on cloud dashboard by the display module in the cloud network;

completion of the test; and providing to the user real-time data from the IoT sensor for performance, wherein the test results are displayed as one or more of location data, network data, signal strength, enabling the user to identify, select the network of optimal signal strength, and wherein the method further comprises of display of signal strength with location data in the cloud dashboard.

22. The method of identification/detection, selection and validation of wireless network for IoT devices as claimed in claim 21, wherein the network data comprises of one or more of network operator information, network mode, Received Signal Strength Indicator (RSSI), Reference Signals Received Power (RSRP), Reference Signal Received Quality (RSRQ), Signal-to-interference-plus-noise ratio (SINR), Key Process Indicators (KPI's), Network parameters and the like.

23. The method of identification/detection, selection and validation of wireless network for IoT devices as claimed in claim 21, wherein the network data is represented as Key process indicators (KPIs') comprising one or more of Reference Signal Received Power (RSRP), Received Signal Strength Indicator (RSSI), Reference Signal Received Quality (RSRQ), Reference Signal Signal-to-Noise Ratio (RSSNR), Downlink, Uplink data.

24. A system for identification/detection, selection and validation of wireless network for IoT devices, comprising:

an application programming interface (API)/mobile platform 105 at a user interface (UI) on a computer implementable device 102 at the user end;

hardware kit/dongle or Network detection dongle 103;

communication network 110;

a server 115;

one or more network modules of network operators/vendors;

a display module 114 configured to display analytics data real-time at the user interface at the cloud dashboard 130; and one or more IoT sensors or devices to be deployed or installed 120, wherein the API 105 is configured to run a network detection software on the server 115 when connected to the communication network 110 to provide real-time network intelligence insights, and wherein the API 105 is installed on one or more computer implementable devices 102, when connected to the Network detection dongle 103 is configured to initiate the API, detect the signal strength of one or more connectivity technologies real time or near real time from one or more network modules of network operators/vendors 127, via the application program interface 105 or a thin client within the module and then transferred to the server 115, to determine and validate an optimal location for IoT sensor/device installation or deployment based on the highest signal strength.

* * * * *